US008662982B1

(12) United States Patent
Smith et al.

(10) Patent No.: US 8,662,982 B1
(45) Date of Patent: Mar. 4, 2014

(54) METHOD AND APPARATUS FOR ATTRACTIVE BONUSING

(71) Applicant: IGT, Reno, NV (US)

(72) Inventors: Vincent P. Smith, Las Vegas, NV (US); Cameron Anthony Filipour, Las Vegas, NV (US); Dan Uomini, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/631,100

(22) Filed: Sep. 28, 2012

(51) Int. Cl.
*A63F 13/00* (2006.01)

(52) U.S. Cl.
USPC .................. 463/16; 463/20; 463/30; 463/31; 463/42

(58) Field of Classification Search
USPC .......................................... 463/16–20, 40–42
See application file for complete search history.

(56) References Cited

U.S. PATENT DOCUMENTS 3,167,313 A 1/1965 Davenport et al.
4,003,578 A 1/1977 Jones
4,103,895 A 8/1978 Pressman et al.
4,182,515 A 1/1980 Nemeth
4,251,078 A 2/1981 Meirovitz
4,277,067 A 7/1981 Gettleman
4,323,242 A 4/1982 Rosenfeld
4,511,143 A 4/1985 Sankrithi
4,548,410 A 10/1985 Morrone
4,820,908 A 4/1989 Wei
4,850,592 A 7/1989 Winter
5,080,368 A 1/1992 Weisser
5,083,800 A 1/1992 Lockton
5,178,395 A 1/1993 Lovell
5,178,545 A 1/1993 Thompson
5,333,868 A 8/1994 Goldfarb
5,342,049 A 8/1994 Wichinsky et al.
5,355,442 A 10/1994 Paglieroni et al.
5,566,942 A 10/1996 Elum
5,611,730 A 3/1997 Weiss
5,664,998 A * 9/1997 Seelig et al. .................... 463/20
5,769,716 A 6/1998 Saffari et al.
5,772,509 A 6/1998 Weiss
5,779,545 A 7/1998 Berg et al.
5,813,672 A 9/1998 Loud, Jr.
5,855,514 A 1/1999 Kamille (Continued)

FOREIGN PATENT DOCUMENTS

EP 0945837 9/1999
EP 1199689 4/2002

(Continued)

*Primary Examiner* — Ronald Laneau
*Assistant Examiner* — Ross Williams
(74) *Attorney, Agent, or Firm* — Neal, Gerber & Eisenberg LLP

(57) ABSTRACT

A method for a game includes providing a plurality of individual gaming machines for playing a base game, where an outcome of each gaming machine is determined at least in part by chance, and communicatively coupling a progressive bonus apparatus to said plurality of individual gaming machines. The method includes creating value elements and inserting them onto individual gaming machines in a bank of gaming machines. The value elements can be seen visually by players so that the players can monitor the status of the bonus game while playing the base game. Also disclosed is an apparatus capable of carrying out the above method as well as a media carrying an instruction set for carrying out the above method.

24 Claims, 10 Drawing Sheets

(56) References Cited

U.S. PATENT DOCUMENTS

| | | | |
|---|---|---|---|
| 5,931,467 | A | 8/1999 | Kamille |
| 5,947,820 | A | 9/1999 | Morro et al. |
| 5,961,384 | A | 10/1999 | Robinson |
| 5,980,384 | A | 11/1999 | Barrie |
| 6,015,346 | A | 1/2000 | Bennett |
| 6,089,976 | A | 7/2000 | Schneider et al. |
| 6,102,798 | A | 8/2000 | Bennett |
| 6,110,043 | A | 8/2000 | Olsen |
| 6,126,542 | A | 10/2000 | Fier |
| 6,134,556 | A | 10/2000 | Shin |
| 6,159,095 | A | 12/2000 | Frohm et al. |
| 6,159,098 | A | 12/2000 | Slomiany et al. |
| 6,165,070 | A | 12/2000 | Nolte et al. |
| 6,217,448 | B1 | 4/2001 | Olsen |
| 6,254,481 | B1 | 7/2001 | Jaffe |
| 6,257,981 | B1 | 7/2001 | Acres et al. |
| 6,261,177 | B1 | 7/2001 | Bennett |
| 6,273,420 | B1 | 8/2001 | Brooks |
| 6,309,299 | B1 | 10/2001 | Weiss |
| 6,309,300 | B1 | 10/2001 | Glavich |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,340,159 | B1 | 1/2002 | Giangrante |
| 6,346,043 | B1 | 2/2002 | Colin et al. |
| 6,347,996 | B1 | 2/2002 | Gilmore et al. |
| 6,364,767 | B1 | 4/2002 | Brossard et al. |
| 6,364,768 | B1 * | 4/2002 | Acres et al. ..................... 463/25 |
| 6,386,974 | B1 | 5/2002 | Adams |
| 6,398,644 | B1 | 6/2002 | Perrie et al. |
| 6,406,369 | B1 | 6/2002 | Baerlocher et al. |
| 6,419,226 | B2 | 7/2002 | Krise et al. |
| 6,425,824 | B1 | 7/2002 | Baerlocher et al. |
| 6,428,412 | B1 | 8/2002 | Anderson et al. |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,494,785 | B1 | 12/2002 | Gerrard et al. |
| 6,511,375 | B1 | 1/2003 | Kaminkow |
| 6,514,141 | B1 | 2/2003 | Kaminkow et al. |
| 6,558,254 | B2 | 5/2003 | Baelocher et al. |
| 6,572,469 | B2 | 6/2003 | Klitsner et al. |
| 6,572,472 | B1 | 6/2003 | Glavich |
| 6,572,473 | B1 | 6/2003 | Baerlocher |
| 6,579,178 | B1 | 6/2003 | Walker et al. |
| 6,582,307 | B2 | 6/2003 | Webb |
| 6,589,117 | B1 | 7/2003 | Moritome et al. |
| 6,595,854 | B2 | 7/2003 | Hughs-Baird et al. |
| 6,599,185 | B1 | 7/2003 | Kaminkow et al. |
| 6,602,136 | B1 | 8/2003 | Baerlocher et al. |
| 6,602,137 | B2 | 8/2003 | Kaminkow et al. |
| 6,607,438 | B2 | 8/2003 | Baerlocher et al. |
| 6,632,141 | B2 | 10/2003 | Webb et al. |
| 6,638,164 | B2 | 10/2003 | Randall et al. |
| 6,641,137 | B2 | 11/2003 | Sines et al. |
| 6,645,071 | B2 | 11/2003 | Perrie et al. |
| 6,645,073 | B2 | 11/2003 | Lemay et al. |
| 6,645,074 | B2 | 11/2003 | Thomas et al. |
| 6,656,040 | B1 | 12/2003 | Brossman et al. |
| 6,656,048 | B2 | 12/2003 | Olsen |
| 6,666,766 | B2 | 12/2003 | Baerlocher et al. |
| 6,676,516 | B2 | 1/2004 | Baerlocher et al. |
| 6,692,356 | B2 | 2/2004 | Baerlocher et al. |
| 6,722,981 | B2 | 4/2004 | Kaminkow et al. |
| 6,722,982 | B2 | 4/2004 | Kaminkow et al. |
| 6,733,386 | B2 | 5/2004 | Cuddy et al. |
| 6,743,096 | B2 | 6/2004 | Allendorf et al. |
| 6,749,504 | B2 | 6/2004 | Hughs-Baird |
| 6,752,312 | B1 | 6/2004 | Chamberlain et al. |
| 6,758,747 | B2 | 7/2004 | Baerlocher |
| 6,769,983 | B2 | 8/2004 | Slomiany |
| 6,780,107 | B2 | 8/2004 | Baerlocher et al. |
| 6,780,110 | B2 | 8/2004 | Baerlocher et al. |
| 6,780,111 | B2 | 8/2004 | Cannon et al. |
| 6,783,455 | B2 | 8/2004 | Glavich |
| 6,783,457 | B2 | 8/2004 | Hughs-Baird et al. |
| 6,786,820 | B2 | 9/2004 | Gerrard et al. |
| 6,808,454 | B2 | 10/2004 | Gerrard et al. |
| 6,814,664 | B2 | 11/2004 | Baerlocher et al. |
| 6,817,944 | B2 | 11/2004 | Kaminkow et al. |
| 6,837,793 | B2 | 1/2005 | McClintic |
| 6,840,856 | B2 | 1/2005 | Stern |
| 6,843,722 | B2 | 1/2005 | Webb |
| 6,852,027 | B2 | 2/2005 | Kaminkow et al. |
| 6,863,606 | B1 | 3/2005 | Berg et al. |
| 6,875,108 | B1 | 4/2005 | Hughs-Baird |
| 6,884,173 | B2 | 4/2005 | Gauselmann |
| 6,899,620 | B2 | 5/2005 | Kaminkow et al. |
| 6,902,478 | B2 | 6/2005 | McClintic |
| 6,908,383 | B2 | 6/2005 | Baerlocher et al. |
| 6,913,533 | B2 | 7/2005 | Cuddy et al. |
| 6,918,830 | B2 | 7/2005 | Baerlocher |
| 6,932,701 | B2 | 8/2005 | Glavich et al. |
| 6,935,947 | B1 | 8/2005 | Singer et al. |
| 6,958,013 | B2 | 10/2005 | Miereau et al. |
| 6,966,833 | B2 | 11/2005 | Kaminkow et al. |
| 6,969,318 | B1 | 11/2005 | Packes, Jr. et al. |
| 6,971,953 | B2 | 12/2005 | Gerrard et al. |
| 6,971,954 | B2 | 12/2005 | Randall et al. |
| 6,988,947 | B2 | 1/2006 | Baerlocher et al. |
| 6,988,948 | B2 | 1/2006 | Perrie et al. |
| 6,995,751 | B2 | 2/2006 | Falvo |
| 6,996,833 | B1 | 2/2006 | Olson et al. |
| 7,037,191 | B2 | 5/2006 | Rodgers et al. |
| 7,037,195 | B2 | 5/2006 | Schneider et al. |
| 7,040,984 | B2 | 5/2006 | Mead |
| 7,052,392 | B2 | 5/2006 | Tessmer et al. |
| 7,056,214 | B2 | 6/2006 | Miereau et al. |
| 7,077,744 | B2 | 7/2006 | Cannon |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,160,186 | B2 | 1/2007 | Cuddy et al. |
| 7,160,188 | B2 | 1/2007 | Kaminkow et al. |
| 7,168,704 | B1 | 1/2007 | Lawless |
| 7,169,044 | B2 | 1/2007 | Baerlocher et al. |
| 7,172,506 | B2 | 2/2007 | Baerlocher et al. |
| 7,175,523 | B2 | 2/2007 | Gilmore et al. |
| 7,179,166 | B1 | 2/2007 | Abbott |
| 7,182,689 | B2 | 2/2007 | Hughs-Baird et al. |
| 7,198,570 | B2 | 4/2007 | Rodgers et al. |
| 7,201,657 | B2 | 4/2007 | Baerlocher et al. |
| 7,235,011 | B2 | 6/2007 | Randall et al. |
| 7,264,545 | B2 | 9/2007 | Maya et al. |
| 7,294,058 | B1 | 11/2007 | Slomiany et al. |
| 7,300,348 | B2 | 11/2007 | Kaminkow et al. |
| 7,303,469 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,314,408 | B2 | 1/2008 | Cannon |
| 7,314,409 | B2 | 1/2008 | Maya et al. |
| 7,318,773 | B2 | 1/2008 | Baerlocher |
| 7,326,115 | B2 | 2/2008 | Baerlocher |
| 7,329,184 | B2 | 2/2008 | Yoshioka |
| 7,335,102 | B2 | 2/2008 | Baerlocher et al. |
| 7,338,367 | B2 | 3/2008 | Kaminkow et al. |
| 7,338,369 | B2 | 3/2008 | Mierau et al. |
| 7,351,140 | B2 | 4/2008 | Wolf et al. |
| 7,357,714 | B2 | 4/2008 | Tessmer et al. |
| 7,361,087 | B2 | 4/2008 | Baerlocher et al. |
| 7,387,571 | B2 | 6/2008 | Walker et al. |
| 7,393,280 | B2 | 7/2008 | Cannon |
| 7,419,425 | B1 | 9/2008 | Crowder et al. |
| 7,427,235 | B2 | 9/2008 | Anderson et al. |
| 7,427,236 | B2 | 9/2008 | Kaminkow et al. |
| 7,448,949 | B2 | 11/2008 | Kaminkow et al. |
| 7,485,038 | B2 | 2/2009 | Rothkranz et al. |
| 7,500,913 | B2 | 3/2009 | Baerlocher |
| 7,507,156 | B2 | 3/2009 | Nicely |
| 7,513,825 | B2 | 4/2009 | Packes, Jr. et al. |
| 7,568,973 | B2 | 8/2009 | Iddings et al. |
| 7,585,223 | B2 | 9/2009 | Iddings et al. |
| 7,597,621 | B2 | 10/2009 | Baerlocher |

(56) References Cited

U.S. PATENT DOCUMENTS 7,607,976 B2 10/2009 Baerlocher
7,637,811 B2 12/2009 Walker et al.
7,641,548 B2 1/2010 Packes, Jr. et al.
7,654,896 B2 2/2010 Baerlocher
7,666,081 B2 2/2010 Baerlocher et al.
7,666,092 B2 2/2010 Kaminkow et al.
7,666,093 B2 2/2010 Lafky et al.
7,666,094 B2 2/2010 Baerlocher et al.
7,674,180 B2 3/2010 Graham et al.
7,677,971 B2 3/2010 Baerlocher et al.
7,690,977 B2 4/2010 Cuddy et al.
7,695,358 B2 4/2010 Walker et al.
8,029,360 B2 10/2011 Lind et al.
8,047,909 B2 11/2011 Walker et al.
8,052,526 B2 11/2011 Abbott et al.
8,057,294 B2 11/2011 Pacey et al.
8,070,597 B2 12/2011 Cuddy
8,070,600 B2 12/2011 Campo et al.
8,100,760 B2 1/2012 Cannon
8,105,149 B2 1/2012 Dewaal
8,118,656 B2 2/2012 Hamada
8,118,664 B2 2/2012 Johnson
8,118,666 B2 2/2012 Nicely et al.
8,137,188 B2 3/2012 Breckner et al.
8,147,322 B2 4/2012 Walker et al.
8,157,646 B2 4/2012 Pawloski et al.
8,162,746 B2 4/2012 Nicely et al.
8,192,277 B2 6/2012 Soltys et al.
8,201,229 B2 6/2012 Ruppert et al.
8,210,937 B2 7/2012 Cregan et al.
8,251,800 B2 * 8/2012 Cannon ........................... 463/21
8,251,803 B2 8/2012 Nelson
8,262,469 B2 9/2012 Iddings et al.
8,266,213 B2 9/2012 Crowder
8,267,797 B2 9/2012 Thomas et al.
8,287,364 B2 10/2012 Caputo et al.
8,298,063 B2 10/2012 Packes, Jr. et al.
8,313,368 B2 11/2012 Filipour et al.
8,328,626 B2 12/2012 Hornik
8,328,631 B2 12/2012 Baerlocher
8,328,633 B2 12/2012 Cohen et al.
8,328,635 B2 12/2012 Oosthoek
8,337,298 B2 12/2012 Baerlocher
8,342,932 B2 1/2013 Fleckenstein et al.
8,342,947 B2 1/2013 Baerlocher et al.
8,347,303 B2 1/2013 Singh et al.
8,348,749 B1 1/2013 Ungaro et al.
8,348,753 B2 1/2013 Low et al.
8,366,542 B2 2/2013 White et al.
8,371,931 B2 2/2013 Decasa et al.
8,376,836 B2 2/2013 Baerlocher et al.
8,376,839 B2 2/2013 Lesley et al.
8,382,584 B2 2/2013 White et al.
8,408,993 B2 4/2013 Lafky et al.
8,408,994 B2 4/2013 Baerlocher et al.
8,412,768 B2 4/2013 Rajaraman et al.
8,414,371 B2 4/2013 Tempest et al.
8,419,549 B2 4/2013 Kaminkow et al.
8,423,790 B2 4/2013 Atashband et al.
8,430,747 B2 4/2013 Kniesteadt et al.
8,439,739 B2 5/2013 Walker et al.
8,439,744 B2 5/2013 Englman et al.
8,444,480 B2 5/2013 Baerlocher et al.
8,449,366 B2 5/2013 Thomas
8,449,380 B2 5/2013 Baerlocher et al.
2002/0052232 A1 5/2002 Kaminkow
2003/0013514 A1 1/2003 Cregan et al.
2003/0036422 A1 2/2003 Baerlocher et al.
2003/0036424 A1 2/2003 Baerlocher
2003/0040358 A1 2/2003 Rothkranz et al.
2003/0064773 A1 4/2003 Baerlocher et al.
2003/0078096 A1 4/2003 Kaminkow et al.
2003/0153378 A1 8/2003 Schlegel et al.
2003/0157982 A1 8/2003 Gerrard et al.
2003/0162578 A1 8/2003 Baerlocher et al.
2003/0186733 A1 10/2003 Wolf et al.
2004/0048644 A1 3/2004 Gerrard et al.
2004/0048649 A1 3/2004 Peterson et al.
2004/0048657 A1 3/2004 Gauselmann
2004/0053665 A1 3/2004 Baerlocher
2004/0106444 A1 6/2004 Cuddy et al.
2004/0176156 A1 9/2004 Walker et al.
2004/0235552 A1 11/2004 Gauselmann
2004/0242315 A1 12/2004 Paulsen et al.
2004/0248639 A1 12/2004 Slomiany
2005/0020351 A1 1/2005 Baerlocher et al.
2005/0033461 A1 2/2005 Gerrard et al.
2005/0054404 A1 3/2005 Baerlocher
2005/0054405 A1 3/2005 Baerlocher et al.
2005/0054415 A1 3/2005 Kaminkow et al.
2005/0054416 A1 3/2005 Hostetler et al.
2005/0054435 A1 3/2005 Rodgers et al.
2005/0054436 A1 3/2005 Frizzell et al.
2005/0059456 A1 3/2005 Mead et al.
2005/0059460 A1 3/2005 Breen et al.
2005/0059461 A1 3/2005 Ching et al.
2005/0064928 A1 3/2005 Baerlocher et al.
2005/0096114 A1 5/2005 Cannon et al.
2005/0096123 A1 5/2005 Cregan et al.
2005/0101372 A1 5/2005 Mierau et al.
2005/0101378 A1 5/2005 Kaminkow et al.
2005/0181860 A1 8/2005 Nguyen et al.
2005/0192081 A1 9/2005 Marks et al.
2005/0197180 A1 9/2005 Kaminkow et al.
2005/0218591 A1 10/2005 Torigian et al.
2006/0025195 A1 2/2006 Pennington et al.
2006/0030401 A1 2/2006 Mead et al.
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0046822 A1 3/2006 Kaminkow et al.
2006/0068882 A1 3/2006 Baerlocher et al.
2006/0068893 A1 3/2006 Jaffe et al.
2006/0073868 A1 4/2006 Nordman
2006/0073874 A1 4/2006 Cregan et al.
2006/0084500 A1 4/2006 Baerlocher et al.
2006/0183528 A1 8/2006 Rodgers et al.
2006/0199628 A1 9/2006 Rodgers et al.
2006/0217189 A1 9/2006 Walker et al.
2006/0246977 A1 11/2006 Cannon
2006/0252518 A1 11/2006 Walker et al.
2007/0015566 A1 1/2007 Baerlocher et al.
2007/0032285 A1 2/2007 Wolf
2007/0054732 A1 3/2007 Baerlocher
2007/0054733 A1 3/2007 Baerlocher
2007/0060271 A1 3/2007 Cregan et al.
2007/0060300 A1 3/2007 Baerlocher
2007/0077990 A1 4/2007 Cuddy et al.
2007/0082725 A1 4/2007 Low et al.
2007/0087809 A1 4/2007 Baerlocher
2007/0105620 A1 5/2007 Cuddy et al.
2007/0111783 A1 5/2007 Cuddy et al.
2007/0117606 A1 5/2007 Baerlocher et al.
2007/0129131 A1 6/2007 Kaminkow et al.
2007/0149269 A1 6/2007 Benbrahim
2007/0155464 A1 7/2007 Baerlocher et al.
2007/0155485 A1 7/2007 Cuddy et al.
2007/0167211 A1 7/2007 Rodgers et al.
2007/0167217 A1 7/2007 Kaminkow et al.
2008/0015006 A1 1/2008 George
2008/0020817 A1 1/2008 Kaminkow et al.
2008/0020822 A1 1/2008 Cuddy et al.
2008/0020823 A1 1/2008 Cuddy et al.
2008/0020824 A1 1/2008 Cuddy et al.
2008/0020825 A1 1/2008 Cuddy et al.
2008/0020829 A1 1/2008 Baerlocher
2008/0020842 A1 1/2008 Kaminkow et al.
2008/0020847 A1 1/2008 Kniesteadt et al.
2008/0026808 A1 1/2008 Yoshizawa
2008/0026813 A1 1/2008 Cannon
2008/0051168 A1 2/2008 Kaminkow et al.
2008/0051188 A1 2/2008 Inamura

(56) References Cited

U.S. PATENT DOCUMENTS

| | | | |
|---|---|---|---|
| 2008/0058046 | A1 | 3/2008 | Schwartz et al. |
| 2008/0070662 | A1 | 3/2008 | Verardi et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0070702 | A1 | 3/2008 | Kaminkow et al. |
| 2008/0081690 | A1 | 4/2008 | Baerlocher et al. |
| 2008/0081691 | A1 | 4/2008 | Baerlocher et al. |
| 2008/0090651 | A1 | 4/2008 | Baerlocher |
| 2008/0102916 | A1 | 5/2008 | Kovacs et al. |
| 2008/0102920 | A1 | 5/2008 | Baerlocher |
| 2008/0108401 | A1 | 5/2008 | Baerlocher et al. |
| 2008/0108429 | A1 | 5/2008 | Davis et al. |
| 2008/0113765 | A1 | 5/2008 | DeWaal |
| 2008/0113768 | A1 | 5/2008 | Baerlocher |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |
| 2008/0149292 | A1 | 6/2008 | Scherb |
| 2008/0153564 | A1 | 6/2008 | Baerlocher et al. |
| 2008/0176650 | A1 | 7/2008 | Wolf et al. |
| 2008/0274788 | A1 | 11/2008 | Wilson |
| 2008/0311979 | A1 | 12/2008 | Walker et al. |
| 2009/0042644 | A1 | 2/2009 | Zielinski |
| 2009/0124327 | A1 | 5/2009 | Caputo et al. |

FOREIGN PATENT DOCUMENTS

| | | |
|---|---|---|
| EP | 1298607 | 4/2003 |
| EP | 1531434 | 5/2005 |
| EP | 1764753 | 3/2007 |
| EP | 1779908 | 5/2007 |
| GB | 2097160 | 10/1982 |
| GB | 2113881 | 8/2003 |
| JP | 09-108431 | 4/1997 |
| WO | WO/97/32285 | 9/1997 |
| WO | WO/00/12186 | 3/2000 |
| WO | WO/01/74464 | 10/2001 |
| WO | WO/03/026759 | 4/2003 |
| WO | wo/03/049053 | 6/2003 |
| WO | WO/2005/002697 | 1/2005 |
| WO | WO/2005/015826 | 2/2005 |
| WO | WO/2006/017067 | 2/2006 |
| WO | WO/2007/021724 | 2/2007 |
| WO | WO/2007/052549 | 5/2007 |
| WO | WO/2008/045398 | 4/2008 |
| WO | WO/2008/045464 | 4/2008 |

* cited by examiner

METHOD AND APPARATUS FOR ATTRACTIVE BONUSING

TECHNICAL FIELD

Various embodiments described herein relate to a method and apparatus for displaying the status of a bonus game on at least one gaming machine. The status display also includes icons that elicit and receive a response.

BACKGROUND

Gaming devices, such as slot machines, video poker machines, and the like provide fun and excitement to the player. Gaming, in general, provides an escape from the everyday rigors of life. Gaming devices use bright lights and exciting sounds to have the gaming machines stand out from other gaming machines. Gaming devices, in particular, use one or more displays that enable the player to see and play the game. The one or more displays typically portray the action of the game, and ultimately indicate whether or not the player wins, and how much the player wins.

The quest for gaming instrumentalities which will provide greater game interest and entertainment among players who wager, is an ongoing odyssey. Greater game interest translates into greater revenues for the owners of the games. More interest translates into more money wagered on a machine over time. A popular game will stay on a gaming floor for a longer amount of time since the game owner, such as a casino, will get more revenue from a popular game. Even popular games can have a drop off in popularity over time. New games, or improved games generally enjoy a time of increased popularity. Therefore, the industry always seems to seek different ways of making even popular games have some level of newness. This piques player's interest in the game so that it will draw high number of players while it has the new feature. Increased numbers translate into increased revenue to the owner of the particular game. Different features or different displays, or different aspects of game play are introduced to games fresh and new and keep the players interested in coming to play a particular game.

One way to keep players interested in a game is to add a bonus game to the main or base game. Bonus games attract and keep players at a gaming machine. As a result, bonus games in gaming machines have become much more prevalent and elaborate in recent years. The bonus game is typically a gaming machine, or a random selection device having a gaming play that is enabled by a bonus qualifying signal from an underlying or primary gaming machine. Bonus games include an additional game feature contained within a single gaming machine. For example, in slot machines, video monitors have also been used to provide bonus or secondary games. Players play, for example, a base game of slot until becoming eligible for a bonus game. The base game temporarily pauses, while the player plays the bonus game. When the player completes the bonus game, the gaming device returns the player to the base game.

Bonus games have become a popular element of slot machines and one of the most significant factors influencing player game selection. Bonus game methods and content on a slot machine type gaming device typically fall into three categories: free spin bonuses, pick bonuses, and signature event style bonuses (wheel spin, dice roll, etc). While popular, these bonusing methods have a number of limitations. The limitations include the following which are shared by these methods and which are listed below:

Bonus game anticipation is limited to a subset of base game conditions

Positive reinforcement for betting up in the base game is limited

Accordingly, providing a gaming device with a bonus game that provides some new aspect of the gaming device that further entertains and provides a fun and exciting experience to the user, is desirable.

SUMMARY OF THE DESCRIBED EMBODIMENTS

The various embodiments describe a bonus game that provides entertainment and anticipation over the course of the player's entire play session (even between spins or plays on the base game) and that rewards players when they increase their base game bets. Attractive bonusing provides a more transparent bonusing framework, where players can see and experience their bonus game at all times during play of the base game. In other words, the player is provided with a constant status update by viewing the station or portion of the attractive bonus apparatus that is associated with the particular individual gaming machine. The player is also able to see how other participants are doing with respect to the player's own play. Thus, the player is continually able to play both the base game and the bonus game. Attractive Bonusing gives bonus funds a visual representation in the form of value elements, such as a fish, and shows these funds moving back and forth between a series of linked gaming machines. Base game wagers on participating games attract value elements (such as fish), which represent bonus funds to the player's machine in a clear visual manner, such as by releasing "fish food" that attracts fish. The "fish food" is produced by betting at the player's individual gaming machine. This dynamic creates positive reinforcement for betting. By viewing other players' stations, the player can see how he is positioned with bonus funds or value elements when compared to other players. The player can check the status of other players by viewing the number of value elements at the other player's station. The player can also monitor the actions of the other players to see how aggressively they are attracting the value elements to stay or linger at their station.

A computer system includes an associate module for associating a plurality of stations on the progressive bonus apparatus with a plurality of the individual gaming machines, and a value element module for placing a plurality of value elements on the progressive bonus apparatus. The value elements are movable to a plurality of stations on the progressive bonus apparatus. The computer also includes an elicit module for eliciting a response on the bonus game apparatus to increase bet activity in the base game, individual gaming machines, and a receiving module receiving a response in the form of bet activity at the individual gaming machine. A ranking module ranks at least some of the plurality of stations on the progressive bonus apparatus and associates an attractive signal strength with the plurality of stations. The bet activity at the base game being is at least one factor in setting the attractive signal strength. The computer also includes a value element introduction module for introducing a value element to one of the stations of the progressive bonus apparatus, and a value element motion module for determining factors for moving the value element.

A method for a game includes providing a plurality of individual gaming machines for playing a base game, where an outcome of each gaming machine is determined at least in part by chance, and communicatively coupling a progressive bonus apparatus to said plurality of individual gaming machines. The method also includes relating a plurality of portions of the progressive bonus apparatus to a plurality of the individual gaming machines, and ranking at least some of the plurality of individual gaming machines with a signal strength. The method also includes placing at least one value element in at least one of the plurality of portions of the progressive bonus apparatus. The value element is movable between the plurality of portions of the bonus apparatus partly in response to signal strength of the plurality of individual gaming machines. Movement of the value element is also controlled in other ways. The method includes generating a speed of travel of the value element through one of the portions of the progressive bonus apparatus based on signal strength of the individual gaming machines. The speed of travel is different for at least two individual gaming machines. The speed of travel is slower through a portion of the progressive bonus apparatus associated with an individual gaming machine when the signal strength of an individual gaming machine is greater than the signal strength at another individual gaming machine. The method also can include generating a linger time for the value element. The linger time is an amount of time that the value element stays in one of the plurality of portions of the progressive bonus apparatus. Generating the linger time includes making the linger time different for at least two individual gaming machines. In one embodiment, the linger time for a value element is longer in a portion of the progressive bonus apparatus when the signal strength at the related individual gaming machine is greater than the signal strength at another individual gaming machine. The winnings associated with the bonus game are related to a value element being on the portion of the progressive bonus apparatus when the bonus game is played. More specifically, when the bonus game is played or concluded, the payout to the winner of the bonus game will be related to the value elements positioned at the portion of the bonus apparatus associated with the gaming machine which the player is playing. In some embodiments, the value of the value elements is known, and in other embodiments the value associated with each value element is a mystery. In still further embodiments, the value of some value elements is known, and the value of other value elements is unknown.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail, in order to avoid unnecessarily obscuring the underlying concepts.

Figure 1:
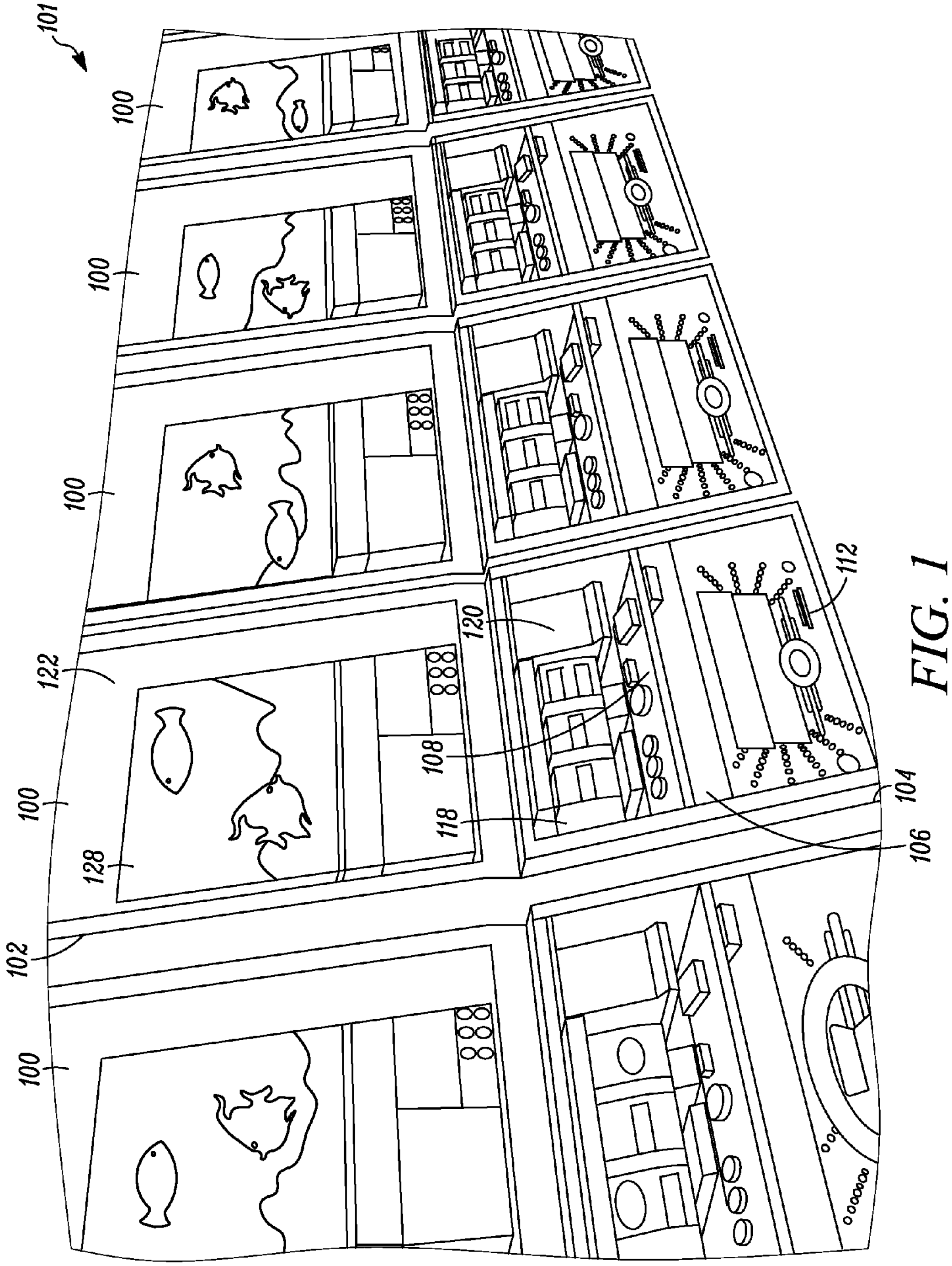
FIG. 1 is a perspective view of a bank of electronic gaming machines that include a bonus game, according to an example embodiment.

FIG. 1 is a perspective view of a bank 101 of a plurality of electronic gaming machines 100 in a gaming environment, such as on a casino floor, according to an example embodiment. The bank 101 shown includes an example embodiment of the invention. As shown in FIG. 1, the bank of slot machines includes a plurality of electronic gaming machines 100. Generally, an electronic gaming machine 100 encloses the computer system 200 (shown in FIG. 2) and additional components which may or may not be coupled to the computer and under computer control, according to an example embodiment. The individual gaming devices can be attached to a network (shown in FIG. 3). The individual electronic gaming machines can be attached in a bank 101 which in turn is attached to a network. Also attached to the network are one or more servers. The server, the gaming device 100, and other devices attached to the network form a gaming system 300 (described in detail with respect to FIG. 3). Such gaming systems can be found on many gaming floors in casinos and elsewhere. In one example embodiment, the gaming system 300 can include a number of gaming machines attached to a network in a progressive game with progressive jackpots.

Gaming machine 100 may be any type of gaming machine, and may include different structures than those shown in FIG. 1. Moreover, gaming machine 100 may employ different methods of operation than those described below.

In one example embodiment, gaming machine 100 includes a main cabinet 102 having a main door 104 hingedly coupled to a front 106 of gaming machine 100. When opened, door 104 provides access to an interior of gaming machine 100. In the example embodiment, pluralities of player-input switches and/or buttons 108 are coupled to main door 104. Many call the pluralities of player-input switches a switch panel. The switch panel is an input/output device. Moreover, the example embodiment includes a bill acceptor 112, for accepting and/or validating cash bills, printed tickets indicating credits, and the like. A video display monitor 118 and an information panel 120 are viewable through main door 104. Video display monitor 118 may be implemented as a cathode ray tube (CRT), a flat-panel liquid crystal display (LCD), a plasma display, an organic light-emitting diode (OLED) display, or any other electronically-controlled video monitor. In another embodiment, the gaming machine 100 includes mechanical reels for displaying the game. Moreover, video display monitor 118 may include touch screen capabilities. The bill acceptor 112, player-input buttons 108, video display monitor 118, and information panel 120 are each used by a player to play an individual game on gaming machine 100. This individual game is a base game. Each component 108, 112, 118, and/or 120 is controlled by a gaming machine controller (shown in FIG. 2) that is housed inside main cabinet 102. Numerous games including, but not limited to only including, video slot games, video poker, video pachinko, video black jack, video card games, and/or video keno may be implemented for play on the individual gaming machine 100.

In the example embodiment, gaming machine 100 also includes a top box 122 that is positioned on a top surface 124 of main cabinet 102. In the example embodiment, top box 122 includes a number of devices that may be used to add features to a game being played on gaming machine 100. As shown in FIG. 1, the top box 122 includes a secondary video display 128 which may be used for any number of purposes, including displaying information related to a bonus game that is communicatively coupled to one or more of the plurality of individual gaming machines 100 that are included in the bank 101 of individual gaming machines. As shown, each of the secondary video displays 128 are associated with a portion of the bonus apparatus. Put another way, the portion of the bonus apparatus can be termed a station and is associated with a specific electronic gaming machine 100. Of course, the top box 122 can include other devices. Such devices may include, but are not limited to only including, speakers a ticket printer for printing bar-coded tickets, a key pad for entering player tracking information, or player preferences or characteristics, a florescent display 138 for displaying player tracking information and/or player preferences or characteristics, and a card reader for receiving a magnetic striped card containing player tracking information and/or player preferences or characteristics encoded thereon. Card reader 140 may also be used to accept coupons, credit cards, debit cards, private house cards, printed cards, smart cards, and/or ticket vouchers. Moreover, top box 122 may house additional devices not shown in FIG. 2, such as, for example, the secondary video display 128, and the like, which may be used to add bonus features to a game being played on gaming machine 100. During game play, such devices may be controlled by circuitry, such as the gaming machine controller housed within main cabinet 102.

Figure 2:
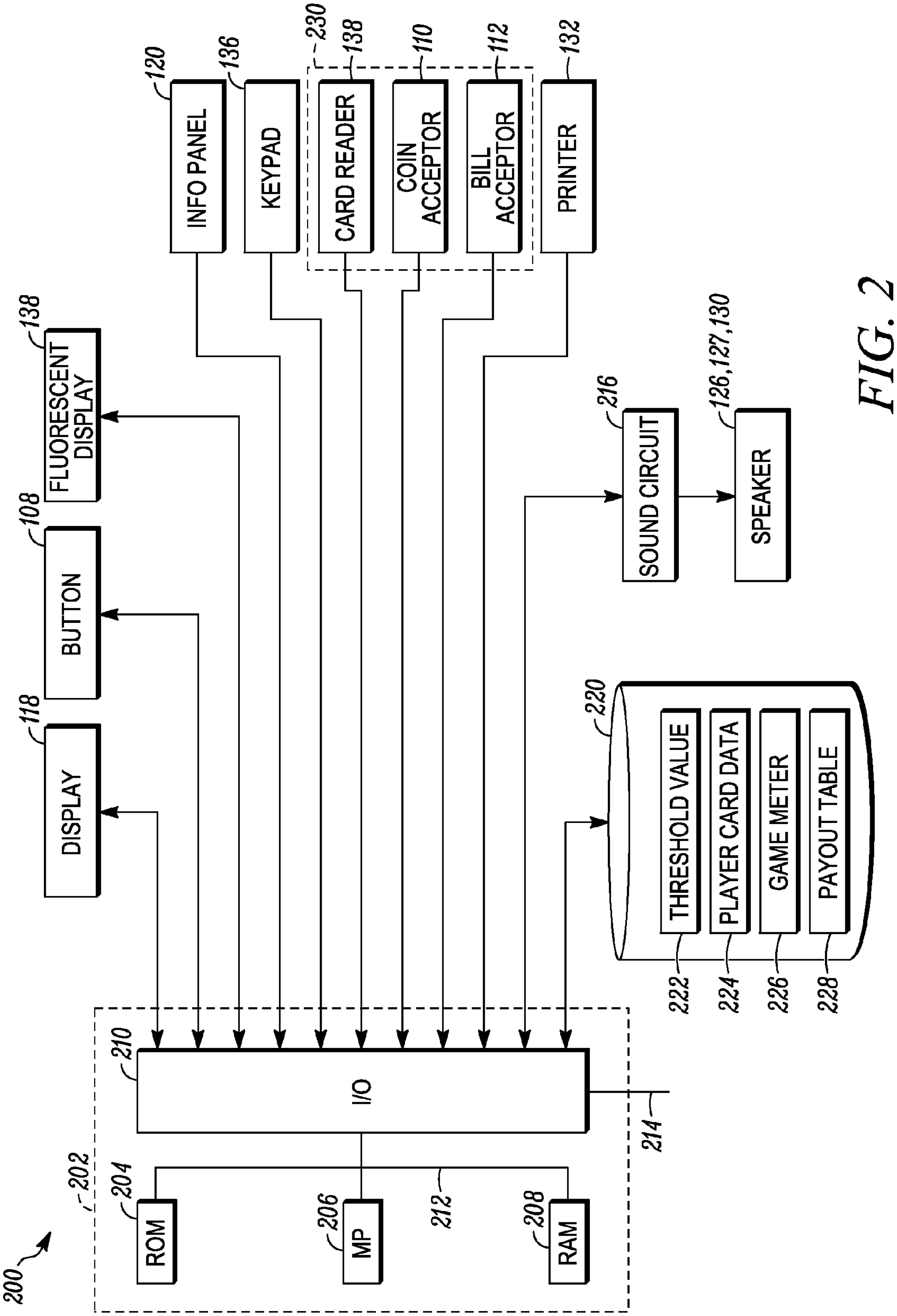
FIG. 2 is a block circuit diagram of an example architecture incorporated into at least one of the electronic gaming machines shown in FIG. 1, according to an example embodiment.

Referring now to FIG. 2, an example block circuit diagram illustrates an example electrical architecture 200 incorporated into an example gaming machine, such as gaming machine 100. In the example embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, each coupled via an address/data bus 212. As used herein, the terms “controller” and “processor” may include any programmable system including systems using microcontrollers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the terms “controller” or “processor”.

Alternative embodiments of controller 202 may include more than one microprocessor 206, multiple RAM modules 208, and/or multiple ROM modules 204. Moreover, although I/O circuit 210 is shown in FIG. 2 as a single component, one of ordinary skill in the art will appreciate that I/O circuit 210 may include any number or a plurality of different types of I/O circuits. Further, RAM 208 and/or ROM 204 may be implemented as, for example, semiconductor memories, magnetically readable memories, and/or optically readable memories. In one embodiment, each operational component of gaming machine 100 is coupled to I/O circuit 210 via a respective conductor. Alternative embodiments may include a single coupling between the operational components of gaming machine 100 and I/O circuit 210. In the example embodiment, I/O circuit 210 is coupled to a gaming network (not shown) via a network interface 214.

Moreover, in the example embodiment, architecture 200 includes a sound circuit 216 that generates audio signals, and that communicates the audio signals between I/O circuit 210 and speakers 126, 127, and/or 130. Further, the gaming machine controller 202 is coupled to a memory area 220, such as, for example, a database. The memory area 220 is configured to store data in regards to the game machine and player information such as, for example, a threshold value 222, player card information 224, a game meter 226 for storing the number of wins at the gaming machine 100, a payout table, and any other data that an operator desires to store at the memory area 220. As used herein, a value input interface 230 may include a coin acceptor 110, the bill acceptor 112, the card reader 140 and any other input device capable of executing the functions described herein. The threshold value 222 can be any value determined by the gaming operator, player or gaming vendor, or any other method that may be supported by the system. The threshold value can be a house limit, a tax liability amount that triggers mandatory withholding of winnings or the like. The threshold value can require the application of special rules, such as tax rules in the example of when the threshold value is an amount that triggers mandatory withholding. In other embodiments, the gaming machine can be programmed to ask the player if they are willing to take an amount below the threshold value to avoid the mandatory withholding requirements. The threshold value can also be an amount that is wagered at one machine or at several machines, in the case of a progressive game, at which a game switches from a first payout scheme associated with a first payout table to a second payout scheme associated with a second payout table.

In an example embodiment, the gaming machine controller 202 displays game images and/or video to the video display monitor 118 of gaming machine 100. Gaming machine controller 202 receives input from a player at the value input interface 230. The gaming machine controller 202 can display to the player a request to input a wager amount and/or amounts of a wager to choose. The player selects the wager amount using the key pad 136 or any other mechanism to indicate a selection.

The threshold value 222 bonus or progressive flag is associated with the payout tables 228 stored in the memory area 220 coupled to the gaming machine controller 202. The payout tables 228 include at least a payout table, but may also include at least one alternative payout table. The gaming machine controller 202 determines an outcome, and based at least partially on the wager, determines a payout based on the payout tables 228 stored in the memory area 220 of gaming machine controller 202.

When the gaming machine controller 202 determines that the payout is greater than the threshold value 222, the payout is altered in the payout tables 228 associated with the wager by a secondary pay table. This pay table can reside in the main games processor, or on a remote server. Although the example discusses a progressive interrupt flag associated with a payout table, other methods to determine the threshold value 222 may be implemented by a gaming operator such as, for example, data stored on a player's card, a predetermined threshold stored in a memory area such as a house limit, tax liability amount or any value determined by the gaming operator, player or gaming vendor, or any other method that may be supported by the system. It should be appreciated that the payout need not be a progressive, but the payout tables 228 of any payout associated with a wager of a specific amount may be altered in the manner described herein. In one embodiment, the payout tables 228 are modified so that a number of different progressive levels may be defined. The defined progressive levels are set based on the wager. That is, if a determined payout results in a win over the threshold value 222, for example, a taxable amount, its modified entry in the payout tables 228 will be set. If the modified payout tables 228 are set for the payout, a flag will be sent to the gaming machine controller 202 when the payout combination is hit.

Figure 3:
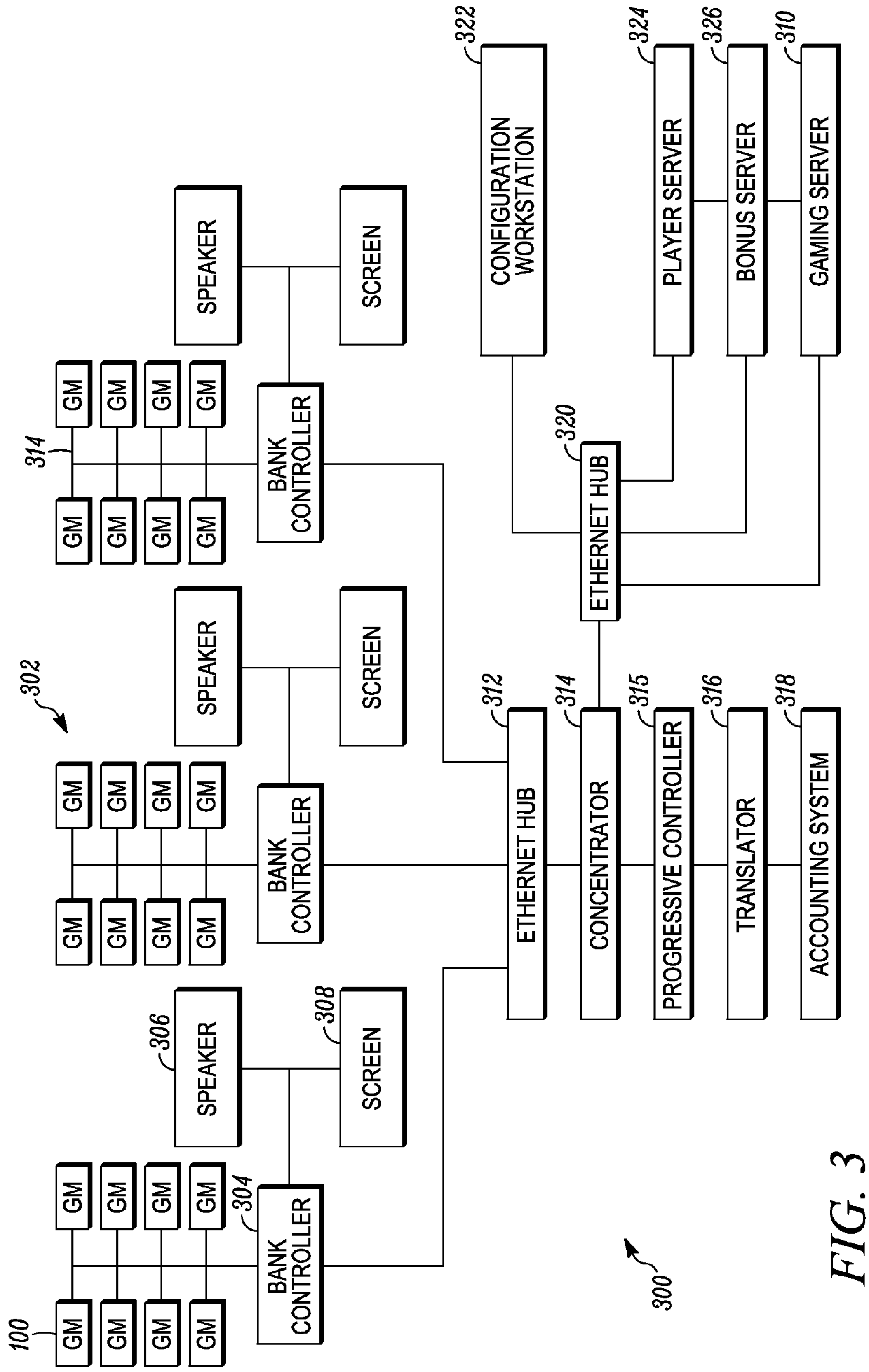
FIG. 3 is a block diagram of an example gaming system or gaming network utilizing an Ethernet hub and bank controllers, according to an example embodiment.

Referring now to FIG. 3, in one embodiment, an example block diagram illustrates a gaming system or gaming network 300 that includes a plurality of gaming machines 100. A gaming network is also referred to as Server based gaming, which is a technology that allows elements of the gaming experience to be configurable based upon a variety of factors. The games could be configurable by a supplier, by a player, or by the operator. This configurability provides a dynamic flexibility that allows greater control of not only how the game plays, but also how the game interacts within the system, and how it looks and feels to the player. Server based gaming has a wide variety of applications and uses in the gaming field. Server based gaming has also provided the ability to incorporate a service window (e.g., a mobile service window) into the main game window to provide information and/or further gaming opportunities to the player.

In this example of FIG. 3, three banks 302 of gaming machines 100 are coupled preferably by an Ethernet. In other embodiments, the gaming machines 100 are coupled using non-Ethernet, private networks, and combinations of networking types. Each gaming machine 100 is coupled via a network connection 214 to a bank controller 304. In one embodiment, each bank controller 304 includes a processor 206 (shown in FIG. 2) that facilitates data communication between each gaming machine 100 within each bank 302, and between each gaming machine 100 and other components of gaming network 300. In one embodiment, each bank controller 304 also includes audio capabilities, such as a CD-ROM drive (not shown) or DVD-ROM drive (not shown), that are coupled to a sound card (not shown) for processing and transmitting digitized sound effects to one or more speakers 306 in response to commands issued over gaming network 300 by bank controller 304. Each bank controller 304 is also coupled via gaming network 300 to an electronic sign or screen 308 that displays information, such as via scrolling and/or flashing messages that indicate, for example, jackpot amounts, and that are visible to players playing gaming machines 100. Messages for display on each electronic screen 308 are generated and/or modified in response to commands issued over gaming network 300 by bank controller 304.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a remote gaming server 310. In such an embodiment, the gaming machine 100 displays results of the game played on gaming server 310 via video display monitor 118 (shown in FIG. 1 above).

A network connector, such as an Ethernet hub 312, couples each bank controller 304 to a concentrator 314. Concentrator 314 functions as a data control switch that routes data from each bank 302 to a translator 316. Translator 316 provides a compatibility buffer (not shown) between concentrator 314, and an accounting system 318. Moreover, translator 316 translates data gathered from each bank 302 into a format that is compatible with accounting system 318. A progressive controller 315 controls, monitors, or otherwise manages progressive games.

Another Ethernet hub 320 couples concentrator 314 to a configuration workstation 322, a player server 324, and to one or more bonus servers 326. Configuration workstation 322 includes a user interface that enables an administrator to set up and/or to modify portions of gaming network 300 and/or servers 310, 324, and 326. Player server 324 tracks data of players using gaming machines 100. Player server 324 also controls messages that appear on each video display monitor 118 and/or information panel 120 of gaming machines 100. In the example embodiment, player server 324 also stores physical characteristics of players, such as the player age and/or vision data. Bonus server 326 controls bonus applications or bonus systems on gaming network 300. Bonus server 326 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

The bonus server 326 as well as the other parts of the gaming network or gaming computer system 300 operate based on a set of instructions stored upon a media. The media can be memory associated with the gaming network 300 or the individual electronic gaming machine 100, a server attached to the gaming network 300, or on the Internet. In some embodiments, the instructions may be stored in the cloud and can be transmitted to a storage location associated with either the gaming network 300 or an electronic gaming machine 100. The instructions can be called software.

The methods described below further detail a bonus game that is played in addition to a base game. The bonusing concept is called attractive bonusing. The attractive bonusing concept addresses all of the bonusing limitations listed above by offering a bonus game that provides entertainment and anticipation over the course of the player's entire play session (even between spins or plays on the base game) and that rewards players when they increase their base game bets in a very satisfying visual manner. Attractive bonusing provides a more transparent bonusing framework where players can see and experience their bonus game at all times during play of the base game. In other words, the player is provided with a constant status update by viewing the station or portion of the attractive bonus apparatus that is associated with the particular individual gaming machine 100. In addition, the player is also able to see how other participants are doing with respect to the player's own play. Thus, the player is continually able to play both the base game and the bonus game. Furthermore, the player can see how their base game behavior increases their winning chances within the bonus game. Attractive Bonusing gives bonus funds a visual representation in the form of value elements, such as a fish, and shows these funds moving back and forth between a series of linked gaming machines. Whenever the bonus is triggered all funds currently on a player's game screen are won. Triggering a bonus can be done in any number of ways. In one embodiment, the triggering event is determined by a "lucky coin". Each coin has a probability of triggering a bonus. Therefore a player who is betting more has a higher probability of triggering a bonus. Other bonus triggering events may be time-based or symbol-based.

Base game wagers on participating games attract value elements (such as fish), which represent bonus funds, to the player's machine in a clear visual manner, such as by releasing "fish food" that attracts fish. The "fish food" is produced by betting at the player's individual gaming machine 100. This dynamic creates positive reinforcement for betting. By viewing other players stations, the player can see how he is positioned with bonus funds or value elements when compared to other players. The ability to view the various stations and check the status of the value elements elicits the player to bet more heavily to produce more fish food to attract more value elements. When the player actually places a bet, this is a response sought by casino operations. In other words, the revenue generated by the base game will rise since the player can constantly monitor his or her position in the bonus game as well as the position in the bonus game of other players. By monitoring the bonus game, the player will play the base game in order to produce more "fish food" or attractant for the value element or value elements. The player will want to maintain his current position or increase the number of value elements attracted to the station associated with the individual gaming machine 100 that the player is positioned at and playing. In one embodiment, when the player produces more fish food, the display is responding to and rewarding bet activity as well as eliciting a response to increase bet activity so that the player at least maintains a current positon in the game. Seeing fish food drop into the top box gives positive reinforcement for betting which will quite often encourage players to bet more.

Figure 4:
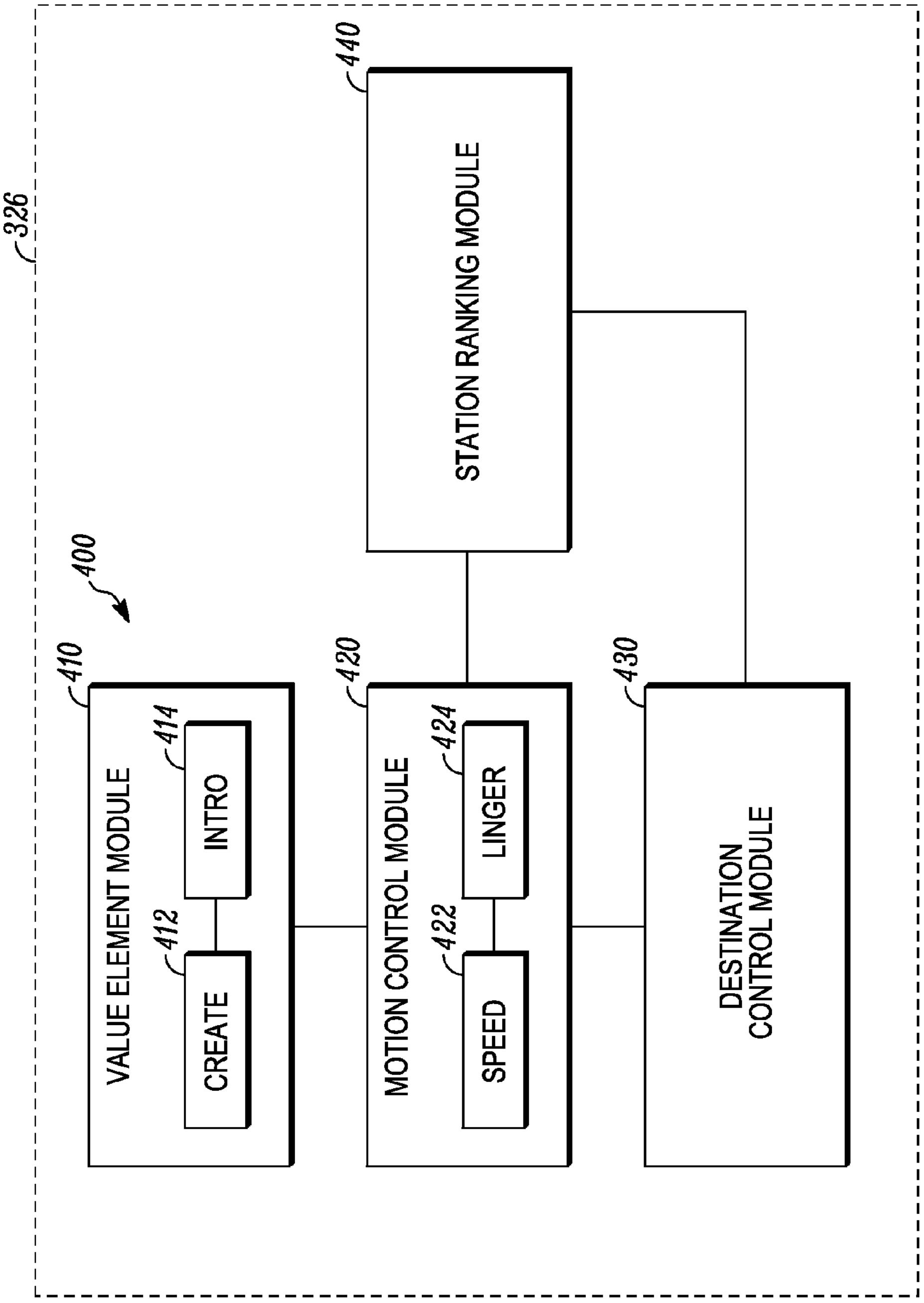
FIG. 4 is another schematic view of at least a part of the bonus apparatus, such as the bonus server, according to an example embodiment.

FIG. 4 is a schematic diagram of a computing subsystem 400 associated with the computer system 300. In the example embodiment shown, the computing subsystem 400 is stored on the bonus server 326. In other embodiments the computing subsystem may be stored on the bonus server and other portions of the computing system 300. The computer subsystem 400 includes a value element module 410, a motion control module 420, a destination control module 430, and a station ranking module 440. Each of the modules 410, 420, 430, 440 can be formed of hardware, hardware and software, or just software. Of course, software is an instruction set that instructs hardware through various steps in order to form the module.

The value element module 410 includes a sub module 412 for creating the value element, and a sub module 414 for introducing the value element. The value element can be anything of value, such as an icon displayed on a display, such as the display 128 of an individual electronic gaming machine 100. The value element module 410, when it is part of the bonus server 326, creates a value element at certain times during the game play. For example, in a progressive game, the value element module may create a new value element when certain triggering events occur. For example, a triggering element may be an amount of coin in or amount of wagers that are paid that represent a threshold at which time a value element is created for a bonus game. The value element module 410 also has sub module 414 that determines where the value element will be introduced. In a progressive game a plurality of electronic gaming machines are participating. The value element enters the game out upon one of these individual electronic gaming machines 100. The value element introduced direction sub module 414 determines where the value element will be introduced. As shown in FIG. 1, the value element will be introduced upon one of the five individual electronic gaming machines 100 shown. As shown in FIG. 1, the value element is a fish. In some embodiments, the fish have known value is associated with them. In other embodiments, the fish have no stated value and are a mystery until a bonus winner is determined.

The motion control module 420 controls the motion of the value elements. The motion control module 420 includes a speed control sub module 422 and a linger control module 424. The speed control sub module 422 determines the speed at which a value element passes a particular station or individual gaming machine 100. The linger control sub module 424 controls the amount of time a value element will linger or hanging around a particular station or individual gaming machine 100 participating in a bonus game. The station may be a secondary video display 120 associated with an individual gaming machine 100 or may be a portion or area of a separate large display that is positioned over a bank of individual gaming machines 100.

The destination control module 430 of the computing system 400 determines where a particular value element will travel to. The destination control module 430 determines to which of the individual gaming machines 100 or which of the stations associated with those gaming machines, the value elements will go. Of course, the destination control module 430 can recalculate destinations at different times and may change destinations at those times so that the value elements are on the move.

The station ranking module 440 ranks the various stations and associates a signal strength to each of the stations. Ranking is based on a number of factors. The factors include current betting activity, previous betting activity, loyalty of the player, and the like. The station ranking module 440 places the individual gaming machines into a rank order and associates a signal strength with each of the individual gaming machines 100. The station ranking module 440 can be programmed in any way. In one embodiment, the station ranking module 440 gives a higher signal strength to higher betting activity to encourage higher betting activity. In another embodiment, the station ranking module 440 gives a higher ranking to a station occupied by a player with a high loyalty rating to reward the player's loyalty to the casino, and so on. In other embodiments, the station ranking module 440 can weight each of several ranking factors to produce the signal strength. In still other embodiments, these weights can be varied based on volume of betting or loyalty rating scores above certain thresholds. The signal strength can be thought of as an attraction signal that is used to attract value elements. In some example embodiments, the computer system 300 includes an associate module for associating a plurality of stations on the progressive bonus apparatus or a portion of the progressive bonus apparatus with a plurality of the individual gaming machines. For example, when a common or shared video screen viewable by a number of players playing the individual gaming machines 100 is used, the associating module associates a portion of the common video screen to one of the individual gaming machines 100 to form a station.

Figure 5:
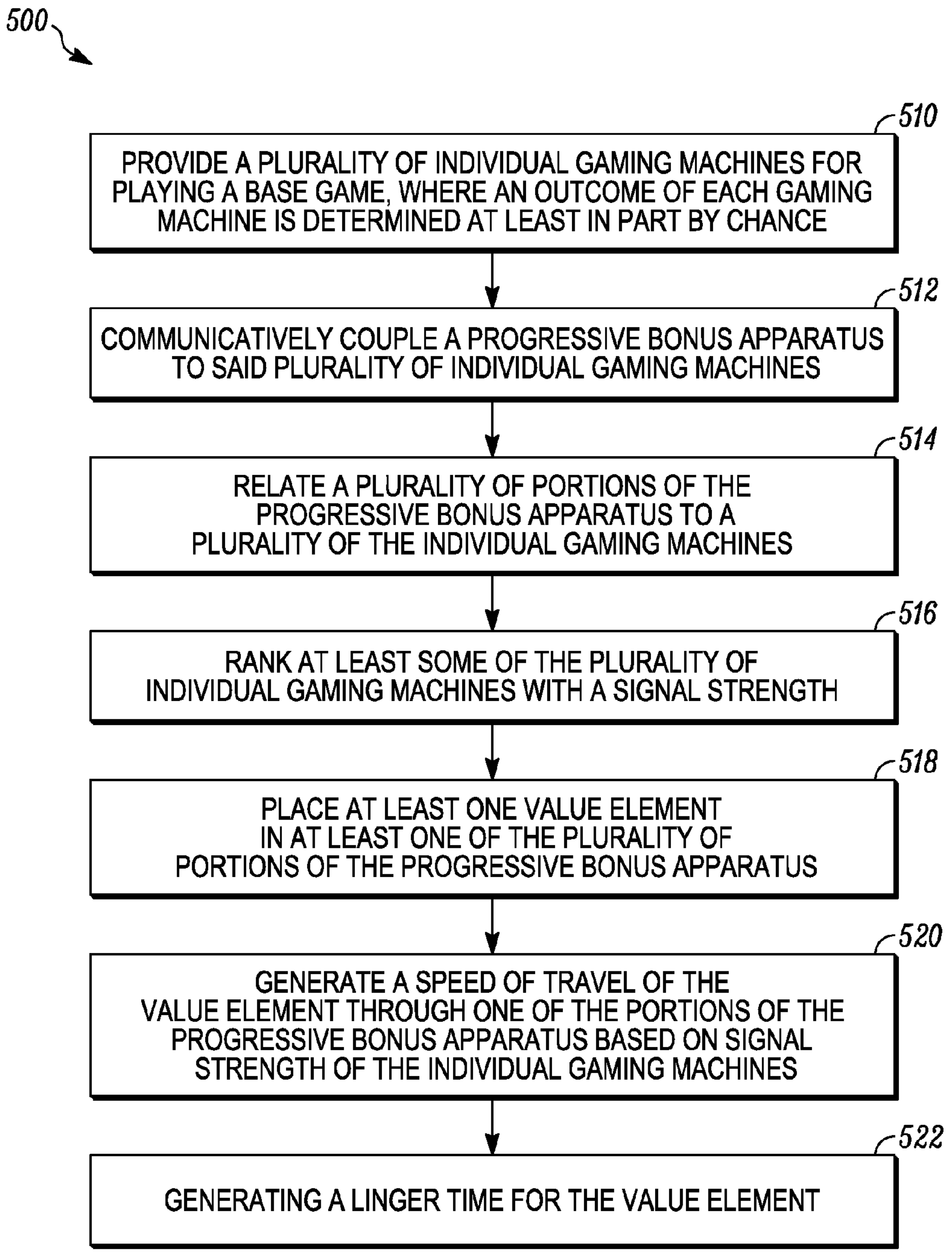
FIG. 5 is a is a flowchart of a method for a game that includes a plurality of individual gaming machines for playing a base game communicatively coupled to a progressive bonus apparatus, according to an example embodiment.

FIG. 5 is a flowchart of a method 500 for a game that includes providing a plurality of individual gaming machines for playing a base game 510, where an outcome of each gaming machine is determined at least in part by chance, and communicatively coupling a progressive bonus apparatus to said plurality of individual gaming machines 512. The method 500 also includes relating a plurality of portions of the progressive bonus apparatus to a plurality of the individual gaming machines 514, and ranking at least some of the plurality of individual gaming machines with a signal strength 516. The method 500 also includes placing at least one value element in at least one of the plurality of portions of the progressive bonus apparatus 518. The value element is movable between the plurality of portions of the bonus apparatus partly in response to signal strength of the plurality of individual gaming machines. Movement of the value element is also controlled in other ways. The method 500 includes generating a speed of travel of the value element through one of the portions of the progressive bonus apparatus based on signal strength of the individual gaming machines 520. The speed of travel is different for at least two individual gaming machines. The speed of travel is slower through a portion of the progressive bonus apparatus associated with an individual gaming machine when the signal strength of an individual gaming machine is greater than the signal strength at another individual gaming machine. The method 500 also can include generating a linger time for the value element 522. The linger time is an amount of estimated time the value element stays in one of the plurality of portions of the progressive bonus apparatus. Generating the linger time 522 includes making the linger time different for at least two individual gaming machines. In one embodiment, the linger time for a value element is longer in a portion of the progressive bonus apparatus when the signal strength at the related individual gaming machine is greater than the signal strength at another individual gaming machine. Of course, it should be noted that when there are many gaming machines associated with a bonus game using attractive bonusing, there may be several gaming machines that have similar linger times. In addition, there may be several gaming machines that have similar travel times between gaming machines. The winnings associated with the bonus game are related to a value element being on the portion of the progressive bonus apparatus when the bonus game is played. More specifically, when the bonus game is played or concluded, the payout to the winner of the bonus game will be related to the value elements positioned at the portion of the bonus apparatus, such as a station, associated with the gaming machine which the player is playing. In some embodiments, the value of the value elements is known, and in other embodiments the value associated with each value element is a mystery. In still further embodiments, the value of some value elements is known and the value of other value elements is unknown.

The method 500 will be described by way of example. The method 500 or the attractive bonusing concept will be tied to a theme called Big Fish Little Fish. In Big Fish Little Fish, the secondary video monitor 128 on each participating electronic gaming machine 100 represents one segment of a large aquarium. The secondary video monitor 120 represents a station where the player is positioned. In this particular embodiment of a game, fish of varying sizes swim back and forth between individual EGMs and each fish is worth a fixed credit amount. Larger fish are worth more than smaller fish. In some embodiments the worth or value of the value element (fish) are placed on the actual fish. Mystery fish pay out a mystery win or unknown amount. Some of the mystery fish may have a high-value while other mystery fish may have a low value. The credit value of each fish may be displayed on the actual fish or within a paytable. Mystery fish may exist in the game whose value is unknown until the bonus is triggered. These fish may eat smaller fish and grow both physically and in value. In some embodiments of the game, all of the fish may be mystery fish and all of the fish may be the same size so that the player only knows he's attracted fish to the station but has no idea of the worth of the fish until the bonus is triggered and a winner is declared. In one embodiment, after the bonus is triggered, there is a reveal step and one or more fish are revealed to be jackpot fish which pay out a progressive award, and all other fish are consolation fish which pay out smaller, static awards.

Whenever the bonus is triggered, players are paid for all fish currently displayed on their portion of the bonus apparatus or displayed on their station. In another embodiment, when the bonus is triggered less than all players may be paid for their fish. For example, only the top two or three people having fish at their station may be paid when the bonus apparatus triggers a bonus round. This will spur competition amongst the players of the base game to increase the amount and/or frequency of their bets so that they have more fish at their station then other competitive players have it there particular stations. In one embodiment, any fish that were paid out are eliminated, and any fish that were not paid out on will remain in the game or go back into a pool of fish for reintroduction back into the attractive bonus game at a later time.

The more the player bets, the more fish food or attractant is released. Fish food attracts fish and encourages fish to linger or hang around for off longer period of time. The fish food dynamic offers players positive reinforcement and encourages them to bet up.

The fish food attraction dynamic is capable of more fully rewarding players who bet up past a certain point. Rather than increasing a future bonus game multiplier when the player bets up which rewards the player in stages, the attractive bonusing method 500 rewards players in a manner that is substantially proportionate to their bet size and in a manner that the player can see.

In another embodiment, when the bonus is triggered a jackpot fish or jackpot value element can be awarded as part of the bonus event. At any particular time there is a number of value elements, such as fish, that have been attracted to various stations in the bonus game. At the time of the bonus event or substantially near that time, each of the value elements in the bonus game are determined to be either a consolation value element or a jackpot value element. In some embodiments several jackpot value elements may be determined. In other example embodiments, one jackpot value element may be determined from the pool of value elements or fish associated with the bonus game. The selection of the jackpot value element is made at random. Once the jackpot value element has been selected, a table of probabilities is used to determine the jackpot prize associated with that fish. For example, the lowest value of the jackpot will have the highest probability of being awarded for a fish or value element determined to be the jackpot value element. There will be a lesser probability of being awarded a higher value. The level of the jackpot prize will also be determined randomly. The idea of having a jackpot fish or a number of jackpot fish adds volatility and makes the game more attractive to players of the game. In other words, even if a person has one low value fish or value element at his or her associated station, there is a possibility that that fish could be selected as the jackpot fish. As a result players will tend to stay in the game and continue playing because there is still a possibility that they could win a much larger jackpot price should the low value element be selected as a jackpot element, such as a jackpot fish. The value elements not selected as jackpot elements are consolation value elements and are generally awarded the value associated with the value element. For example, a minnow would be a low value element and would pay out a loan number of credits it is a consolation fish, but could pay out large number of credits if it was selected to be the jackpot value element.

In an attractive bonusing game, the motion control module 420 controls the speed of a value element or fish through the speed control submodule 422, and controls the amount of time a value element are fish lingers through a linger control submodule 424. The motion control module 420 governs the movement patterns of fish or value elements. The motion control module 420 is designed to reward players who bet more. The motion control module 420 can take into account current betting as well as historical betting over a particular timeframe.

The motion control module 420 works with data or information produced by the station ranking module 440. As mentioned earlier, the station ranking module 440 ranks each of the various stations or the individual portions of the individual gaming machines 100 that are part of the attractive bonus apparatus and gives them a signal strength value. The signal strength value is a relative value and represents the ability of an individual electronic gaming machine 108 in a bank of such machines 101 to attract value elements such as fish. This signal strength is also in input in controlling fish movement.

Signal strength, in one embodiment, represents current bet level and other factors. The signal strength at a particular station, in one embodiment, is unchanged by winning the bonus. Controls are put in place to prevent one heavy betting player from repeatedly winning all the money, since the bonus often rewards multiple players and since lower bettors sometimes win more than heavy betting players through randomness.

Fish movement may be governed by a travel parameter and a linger parameter such that fish travel slower across the secondary monitor 128 of players have a stronger signal strength and faster across the secondary monitor 128 of players having a lower signal strength. The amount that or the rate of betting is one parameter or criteria for increasing the signal strength at a station. By increasing the signal strength at a station, the fish will travel more slowly through the station and will linger longer at station. The value elements, such as the fish shown in the FIGS. 6-9, will travel faster through stations having lower signal strength. The rate of travel or speed differs from the linger time. The rate of travel is how fast a value element will travel past a station and the linger time deals with the amount of time a value element will stay at a station. Of course it should be understood that the signal strength is not totally reliant on the current betting in the base game, but can be based on previous amounts bet, customer loyalty, or any number of other factors.

Figure 6:
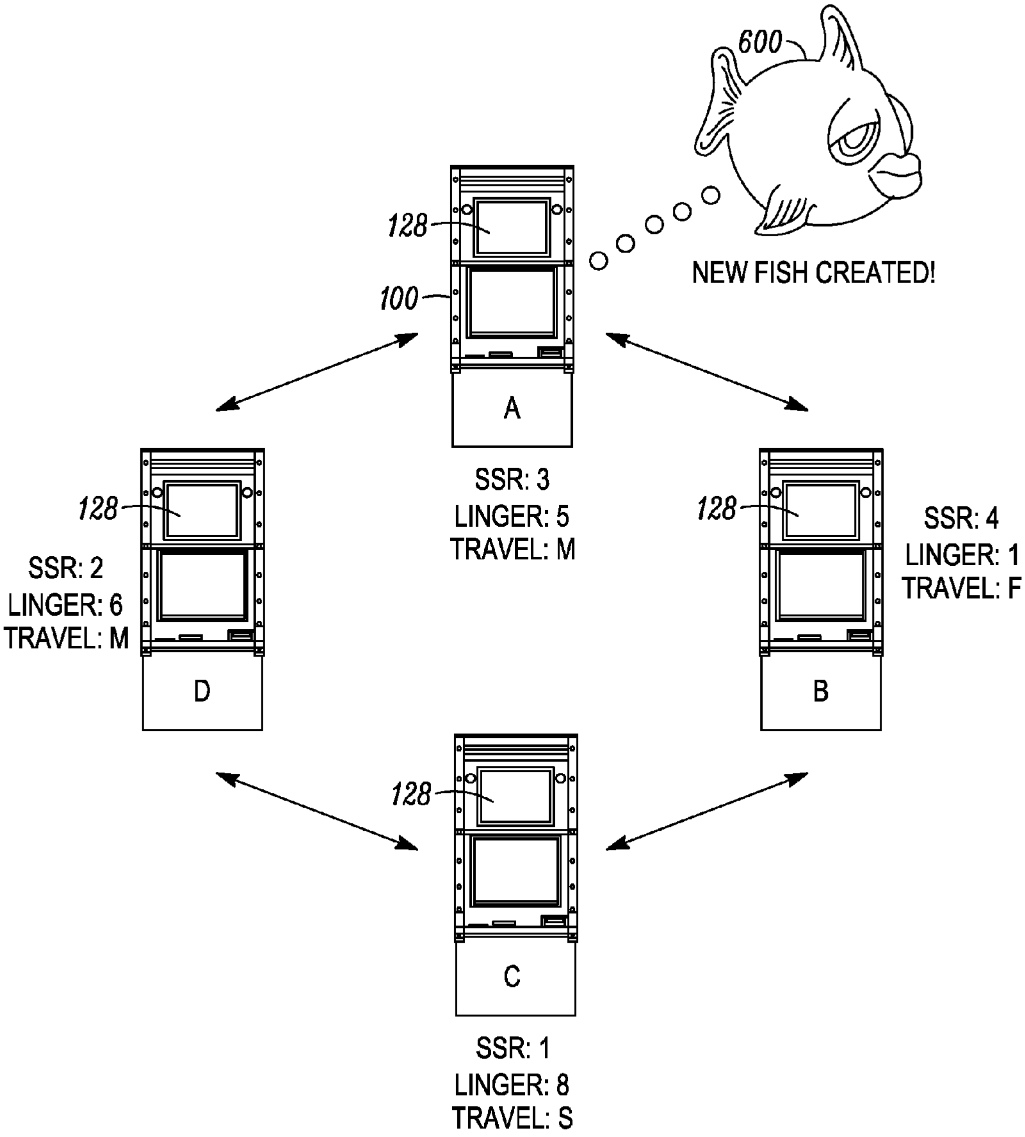
FIG. 6 is a set of individual electronic gaming machines placed in a bank at a time $t_1$, according to an example embodiment.

FIGS. 6-9 depict a set of individual electronic gaming machines 100 placed in a bank 101 at a time $t_1$, $t_2$, $t_3$, and $t_4$, respectively according to an example embodiment. Referring first to FIG. 6 and at the time $t_1$, the various electronic gaming machines 100 have been ranked by the station ranking module 440. The gaming machine C has the highest signal strength rating of “1”. As a result, the linger control module has provided a linger value that is high thereby indicating that a value element will linger or hang around gaming machine C for a relatively long time, when compared to the other gaming machines A, B and D. In addition, the travel speed rating for the gaming machine C has a value of “slow” which means that the value element will travel slowly when in or associated with the station of the individual gaming machine C. On the other hand, gaming machine B, has the weakest signal strength rating of “4”. As a result, the linger rating is “1” and the travel rate has a rating of “fast”. As a result on gaming machine B, the value element will travel quickly through the station or portion of the bonus apparatus associated with the gaming machine B and the value element will linger for the least amount of time when compared to the other gaming machines A, C and D in the bank 101.

In the Big Fish Little Fish example, base game coin-in on participating games drives the creation of new fish. In this particular embodiment, the new fish drops into the secondary monitor 128 on the EGM whose coin-in created them. In other words, when the threshold is met for creating a new fish, the fish is created at the gaming machine 100 that either met or whose bet past the threshold for creation of a new fish. As shown in FIG. 6, the threshold was met by betting on the base game of the individual gaming machine A.

This new fish drop-in method is created by the value element creation submodule 412 using the following steps: 1) randomly selecting the size of the next fish to be introduced. The creation weight is the odds of forming a particular fish. For example, in the table below, the odds of producing a whale are 1 in 1000, while the odds of producing an minnow are 750 in 1000. The size is the credit value. The table is used to determine the class of the next fish to be created (each fish has an appearance type, a credit value, and a creation weight. Once the class of the next fish is determined, the base game contribution, such as a percentage of coin in on the base game, is aggregated. When enough base game coin-in has been collected in the progressive game to create the selected next fish class, the newly created fish is dropped into the individual gaming machine 100 (gaming machine A) in which the coin-in the creation threshold was met. The value and a element creation module 412, then randomly determining the class of the next fish to be created, and repeats the process. A simplified example of that look up table is presented below:

| Appearance Type | Credit Value | Creation Weight |
|---|---|---|
| Minnow | 25 | 750 |
| Guppy | 100 | 184 |
| Tuna | 500 | 60 |
| Shark | 25000 | 5 |
| Whale | 50000 | 1 |

Figure 7:
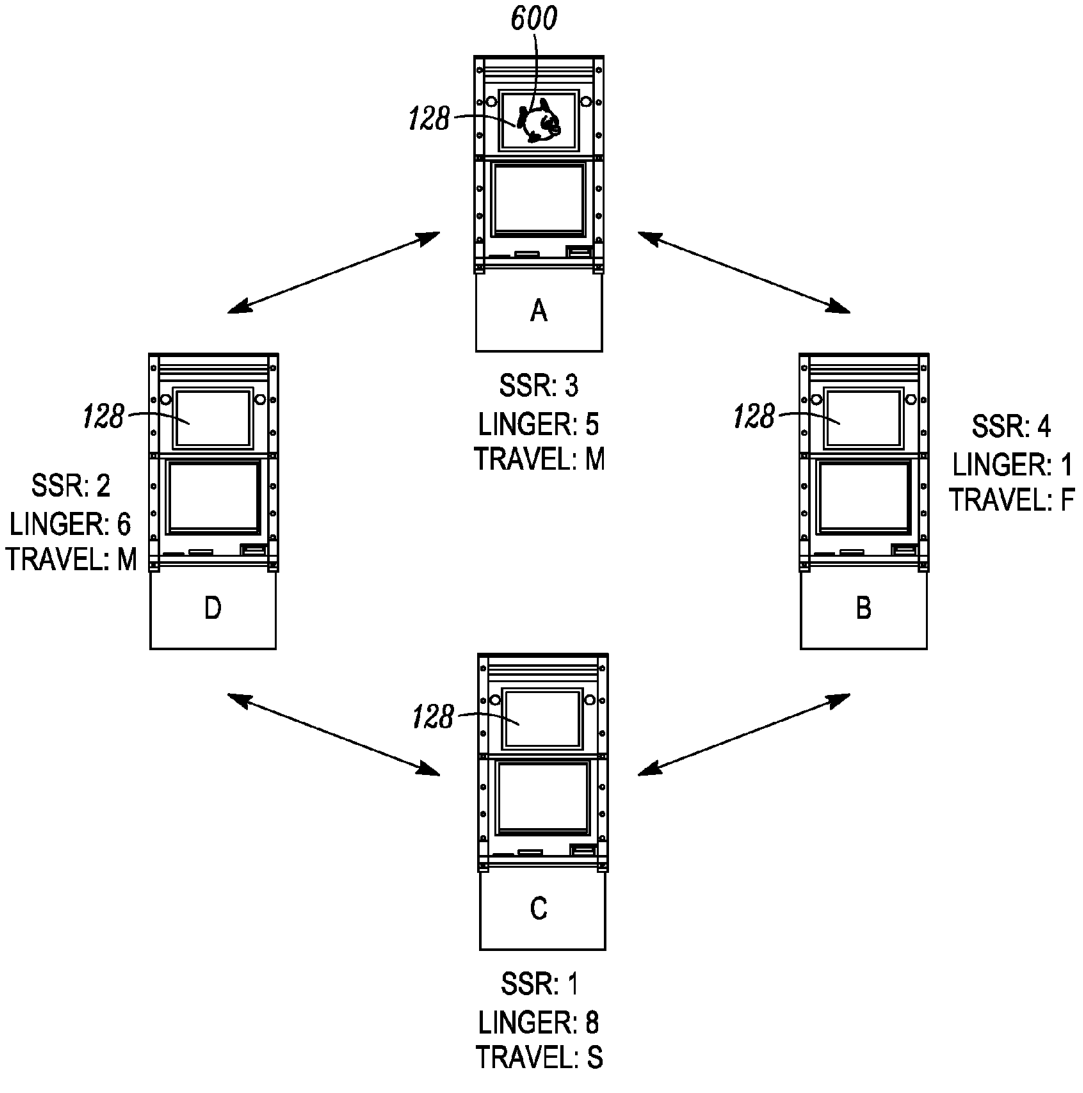
FIG. 7 is a set of individual electronic gaming machines placed in a bank at a time $t_2$, according to an example embodiment.
Figure 8:
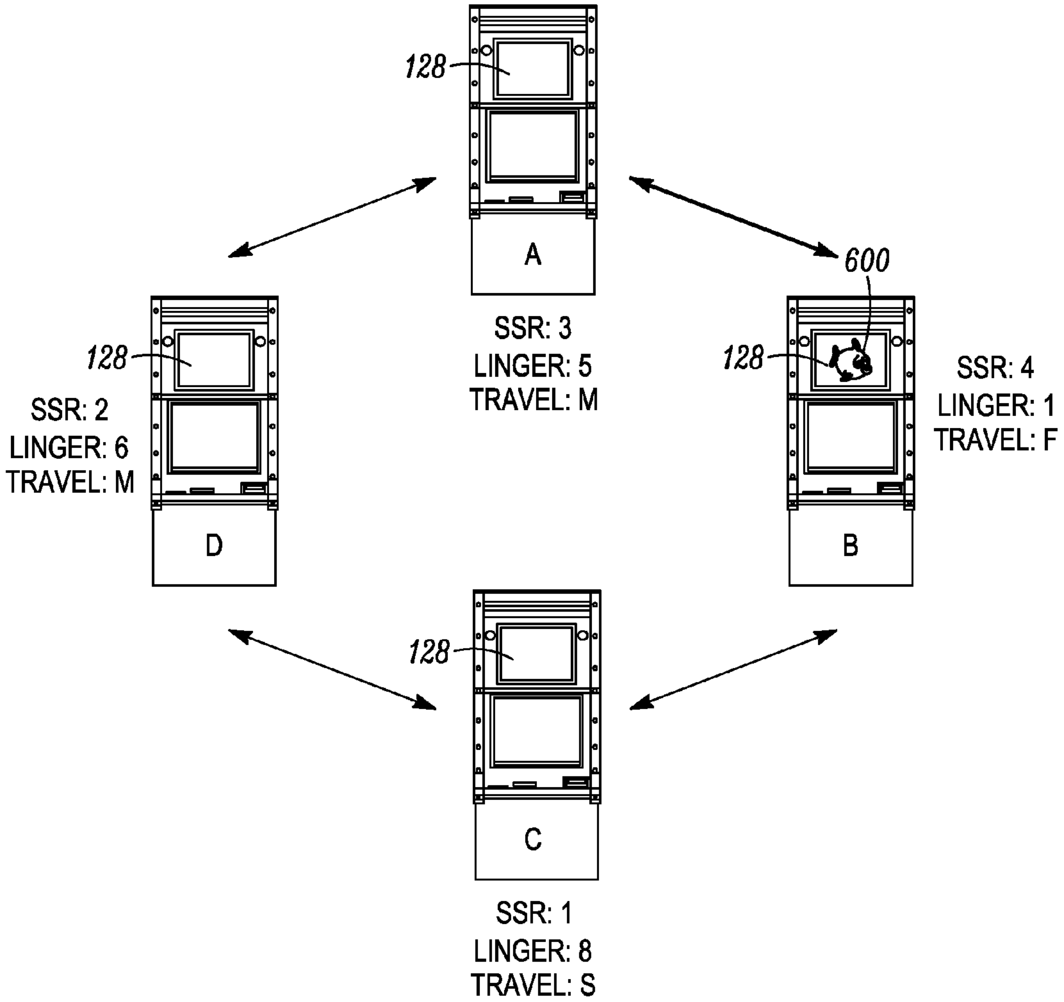
FIG. 8 is a set of individual electronic gaming machines placed in a bank at a time $t_3$, according to an example embodiment.

In FIG. 7, the newly created fish is placed in or at the station associated with individualized gaming machine A. Thus, the player of the individualized gaming machine A placed the bet that met or surpassed the threshold value for creating a new value element or fish. When placed at the machine A, the value element will linger for a relatively long time at the station associated with individualized gaming machine A. Once the value element or fish has lingered for the time associated with a linger value of “5”, the value element or fish will move at a medium speed to another gaming machine. As shown by FIG. 8, the value element has moved to the individualized gaming machine B. The value element are fish 600 will travel through the station or portion of the bonus apparatus, such as secondary monitor 128, in a fast manner and will linger a minimum amount of time since the linger rating is the lowest of the individual electronic gaming machines associated with the bank 101 of gaming machines.

In another example embodiment, the number of new value elements generated is limited to prevent an overrun of smaller value elements. For example, as shown by the table above there is a 750 to 1000 chance that a minnow will be formed for the next value unit. In other words there is a 3 to 4 probability that the next value unit will be a low value minnow. This can cause a problem in that the computer screen or screens that display the value units (for example fish) will be overrun with value units. Therefore, in an alternate embodiment, a maximum number of value units or fish is determined. Once the maximum number of value units or fish has reached a threshold, value unties are or may be updated rather than introducing a new value unit. Upgrading a value unit includes increasing the value associated with the value unit. One of the value units, such as fish, is chosen or selected at random for the upgrade. This prevents an overrun of small fish, such as minnows, which are the most likely to be chosen when a new fish or new value unit is introduced. Of course, in other embodiments, the combination of upgrading a value unit or fish to new value, and the introduction of new value units into the game can be used.

Figure 9:
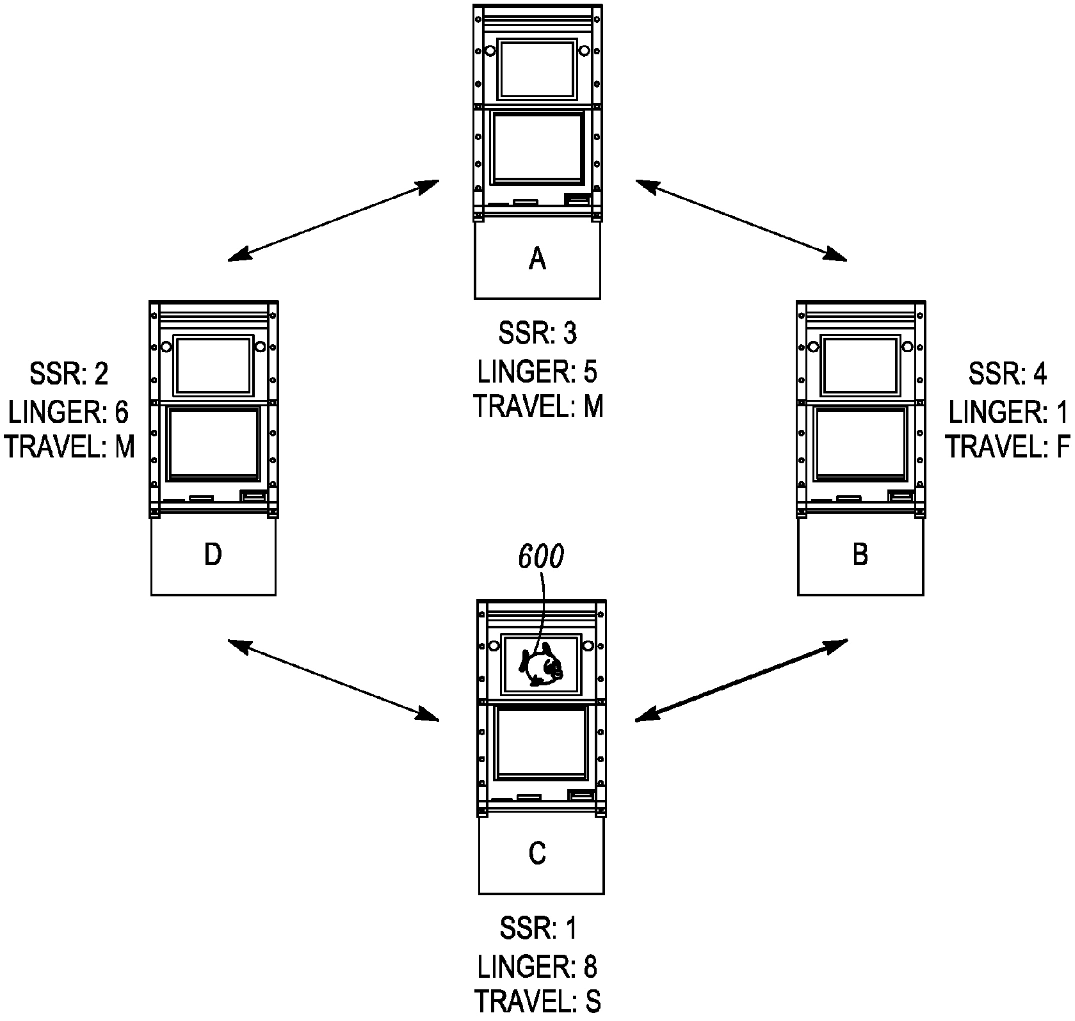
FIG. 9 is a set of individual electronic gaming machines placed in a bank at a time $t_4$, according to an example embodiment.

Now turning to FIG. 9, the value element 600 has traveled to individualized gaming machine C. Once here it will linger for maximum amount of time since individualized gaming machine C has a high linger rating and travel through the station, such as secondary monitor 128, will be slow. The process repeats as the value element 600 travels from station to station or from individualized gaming machine to individualized gaming machine. It should be noted that the travel direction is not always the same. In one embodiment, the various gaming machines are attached in a ring structure like the ones shown in the FIGS. 6-9. In this example embodiment, the value elements can travel in either direction around the ring. At some point additional value elements are created when new coin-in thresholds are met. New value elements, such as the fish shown, can be introduced at any of the gaming machines on the ring. In one example embodiment, the gaming machine where the new value element or fish will be introduced is selected at random. The movement of the various value elements 600 and others are basically controlled in much the same way. In addition, the individualized gaming machines 100 are re-rated at various times. The times can be randomly selected or can be periodic. The frequency of ratings can also be either fast or slow. It should be noted, that the bonus game described above gives an indication of the value of the various value elements. Value elements could also be all unknown and no indication of value can be placed on the value elements. In such a game, the value of the various value elements is unknown until the bonus associated with the bonus apparatus is paid out to the eligible players. Of course, in other embodiments, some of the fish may have indication of value while other fish may be mystery fish having no indication of value.

Base game conditions (i.e. a win of above x credits, specific base game symbol occurs, etc) causes players to win vanity items that allow them to customize their personal aquarium space. Players may be able to trade and or gift these items with one another. These items may or may not affect the signal strength or attraction signal for the player's individual gaming machine.

Fish may represent events/additional bonuses instead of credits. For example a "wheel fish" may swim from individual gaming machine to individual gaming machine and when the bonus is triggered the player whose top glass contains the wheel fish gets to spin a bonus wheel. The math in these cases is not affected since the bonus "wheel fish" would be created once the enough credits were collected from the base game to cover its expected payout.

When players cease betting in Big Fish Little Fish, all of their fish food (attractant) is eaten and fish dissipate. If the player is dormant long enough the individualized gaming machine 100 may lose bonus eligibility such that even if a fish is swimming through and is "captured" on that individualized gaming machine 100 when the bonus is triggered no pay out is issued.

When the bonus triggering event occurs, all eligible gaming machines award players credits for fish contained at their stations and those fish disappear. Any fish that were on non-eligible machines remain in the bonus environment to be won during future trigger events. The bonus also has a reset credit value which is converted into new fish which are added into the bonus environment every time a triggering event occurs.

While Attractive Bonusing has been presented by this example using a fish theme, many themes are possible including but not limited to the following:

- Money Bees (bets grow top glass flowers which attract bees)
- Lucky Ducks (bets drop duck food into top glass pond)
- Princess Charming (bets make a top glass princess more attractive which draws suitors)

In addition it should be noted that the value of value element does not necessarily always have to be positive. In some embodiments, the value of a value element may be negative. For example, there may be a game where you have negative elements which are naughty gremlins. The naughty gremlins, when present, produced negative effects on the player of the game. Therefore the whole point of the game may be to put out a repellent of some sort to repel the negative value elements, rather than an attractant to attract positive value elements.

Among the important elements of the disclosed invention are the following:

1) Displaying current bonus chances to players transparently and not "hiding" the RNG (random number generator) aspects of the bonus play.
2) The dynamic in which the progressive is divided into many awards which physically move between all participating electronic gaming machines.
3) The method of attracting bonus funds to an electronic gaming machine in a manner that is both responsive to base game bet activity and that players can actually visualize.
4) The new award/value element creation method.

Attractive Bonusing concepts such as Big Fish Little Fish may be banked together for maximum visual effect or scattered throughout the casino floor. As long as all electronic gaming machines form a virtual circle there is no theoretical advantage for one electronic gaming machine over another. In practice, however, it may be advantageous to play next to players who are betting heavily since fish will be drawn in the general direction of those electronic gaming machines. This element makes the game simultaneously competitive and collaborative to some degree.

Figure 10:
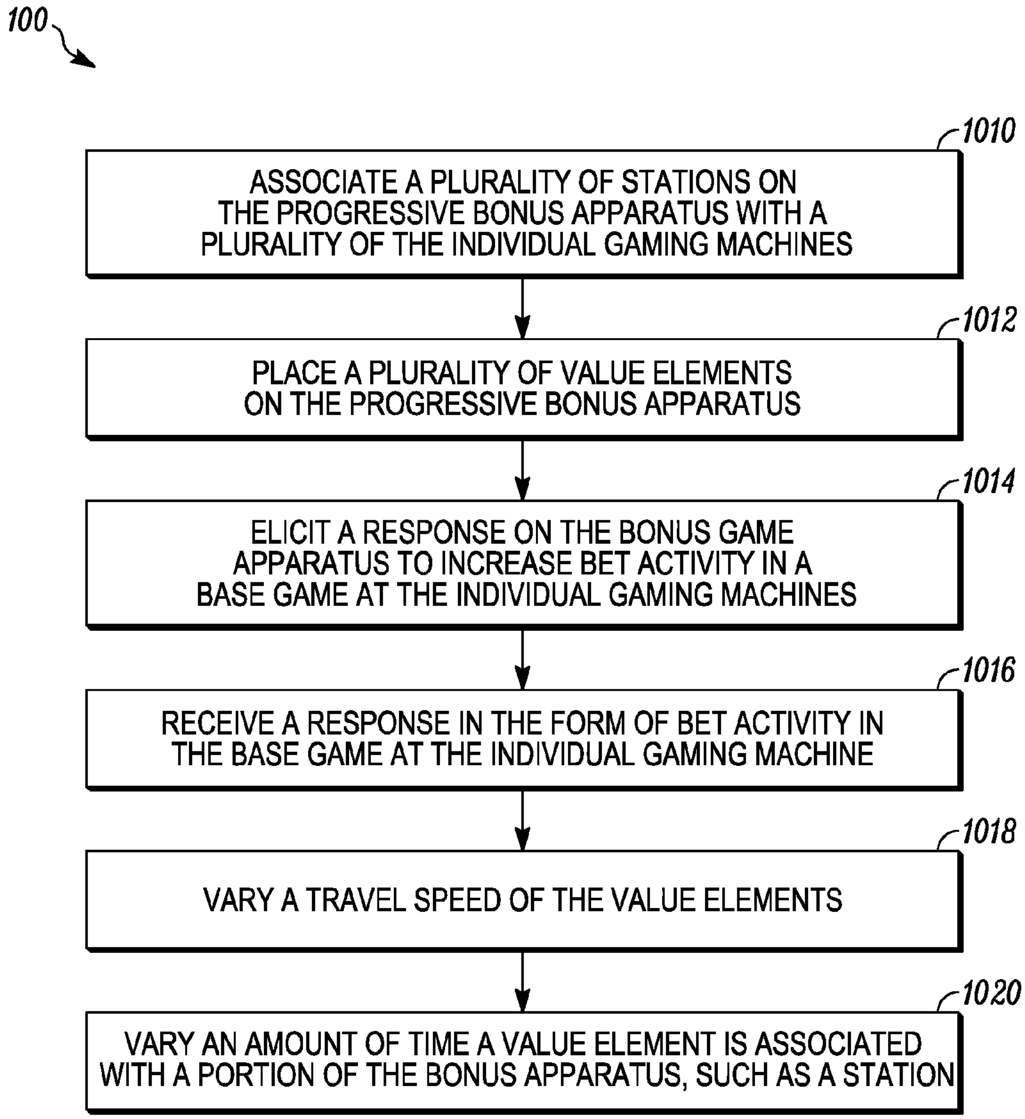
FIG. 10 is a flow chart of a computerized gaming method for operating a bonus game, according to an example embodiment.

FIG. 10 is a flow chart of a computerized gaming method 1000 for operating a bonus game, according to an example embodiment. The computerized method 1000 is for a game having a plurality of individual gaming machines for playing a base game, where an outcome of each gaming machine is determined at least in part by chance, and having a progressive bonus apparatus operatively coupled to said plurality of individual gaming machines. The method 1000 includes associating a plurality of stations on the progressive bonus apparatus 1010 with a plurality of the individual gaming machines. The method 1000 also includes placing a plurality of value elements on the progressive bonus apparatus 1012. The value elements are movable to a plurality of stations on the progressive bonus apparatus. A response is elicited on the bonus game apparatus to increase bet activity in a base game at the individual gaming machines 1014. A response is received in the form of bet activity in the base game at the individual gaming machine 1016. The plurality of individual gaming machines are ranked 1018. An attractive signal strength is associated with the plurality of individual gaming machines. The bet activity on the base game is one factor in determining the rank of the attractive signal strength for attracting one or more value elements to a station of the progressive bonus apparatus related to an individual gaming machine. Eliciting a response 1014 on the bonus game apparatus to increase bet activity at the individual gaming machines includes providing bonus game play instructions indicating that the potential winnings of the bonus game is related to the number of value elements at a station when a bonus game play is triggered. Eliciting a response 1014 on the bonus game apparatus to increase bet activity at the individual gaming machines includes presenting the status of the number of value elements at a station. The status of the number of value elements at least one other station can also be presented to elicit betting activity in the base game. In one embodiment, the value elements are icons on at least one display associated with the bonus game apparatus. In another embodiment, the size of the value elements is related to their value. In still another embodiment, a number indicating value is placed on the value element. In yet another embodiment, at least one value element can have any value. In other embodiments, substantially all the value elements have an associated value which is not revealed during base-game play. The method 1000 also includes varying a travel speed of the value elements 1018. The method 1000 can also include varying an amount of time a value element is associated with a portion of the bonus apparatus, such as a station 1020. The value elements can be controlled to stay longer at portions of the bonus apparatus having higher signal strengths.

A machine-readable medium that provides instructions that, when executed by a machine, cause the machine to perform operations including associating a plurality of stations on the progressive bonus apparatus with a plurality of the individual gaming machines, and placing a plurality of value elements on the progressive bonus apparatus. The value elements can be controllably moved to a plurality of stations on the progressive bonus apparatus. The machine-readable instructions elicit a response on the bonus game apparatus to increase bet activity at the individual gaming machines. A response in the form of bet activity is received at the individual gaming machine. The bet activity is at least one of the factors for producing an attractive signal strength for a station of the progressive bonus apparatus related to an individual gaming machine. The instructions, when executed by a machine, further cause the machine to perform operations that move the value elements between stations. The value elements can be moved past or through a station at a speed based, at least in part, on the attractive signal strength at the associated individual gaming machine. In some embodiments, the value elements can substantially stop the value element at a station for a time based, at least in part, on the attractive signal strength at the associated individual gaming machine. The value elements as icons on a display associated with a bonus gaming apparatus.

The machine-readable medium can also provide instructions that, when executed by a machine, further cause the machine to perform operations to render an attractant as at least one icon on a display associated with a bonus gaming apparatus.

A computer system includes an associate module for associating a plurality of stations on the progressive bonus apparatus with a plurality of the individual gaming machines, and a value element module for placing a plurality of value elements on the progressive bonus apparatus. The value elements are movable to a plurality of stations on the progressive bonus apparatus. The computer also includes an elicit module for eliciting a response on the bonus game apparatus to increase bet activity in the base game individual gaming machines, and a receiving module receiving a response in the form of bet activity at the individual gaming machine. A ranking module ranks at least some of the plurality of stations on the progressive bonus apparatus and associates an attractive signal strength with the plurality of stations. The bet activity at the base game being is at least one factor in setting the attractive signal strength. The computer also includes a value element introduction module for introducing a value element to one of the stations of the progressive bonus apparatus, and a value element motion module for determining factors for moving the value element.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed:

1. A method of operating a gaming system, said method comprising:

causing each of a plurality of individual gaming machines to display a play of a base game, wherein:

an outcome of each play of each base game is determined at least in part by at least one random determination, and one of a plurality of display portions of a bonus apparatus is associated with each of the individual gaming machines;

ranking at least two of the plurality of individual gaming machines with a signal strength;

causing the bonus apparatus to display at least one value element in at least one of the plurality of display portions of the bonus apparatus, the at least one value element being movable between the plurality of display portions of the bonus apparatus partly in response to the signal strengths of the plurality of individual gaming machines; and if a triggering event occurs in association with at least one of the individual gaming machines, providing a player of said at least one individual gaming machine an award based on any value elements displayed, when the triggering event occurs, in the display portion of the bonus apparatus associated with the individual gaming machine, wherein said triggering event occurs distinct from any determination of if any value elements are displayed in the display portion of the bonus apparatus associated with the individual gaming machine.

2. The method of claim 1, which includes generating a speed of travel of at least one of the value elements through at least one of the display portions of the bonus apparatus based on the signal strengths of the individual gaming machines.

3. The method of claim 2, which includes generating a first speed of travel through a first display portion of the bonus apparatus associated with a first of the individual gaming machines based on a first signal strength of the first of the individual gaming machines and generating a second, different speed of travel through a second display portion of the bonus apparatus associated with a second of the individual gaming machines based on a second, different signal strength of the second of the individual gaming machines.

4. The method of claim 1, which includes displaying a value associated with at least one of the plurality of value elements.

5. The method of claim 1, which includes masking a value associated with at least one of the plurality of the value elements.

6. The method of claim 1, which includes:

triggering a bonus;

determining if one of the value elements includes a jackpot element; and converting a value of the value element from an initial value to a jackpot value.

7. The method of claim 1, which includes, for at least one of the value elements, generating a linger time of an amount of time said value element stays in one of the plurality of display portions of the bonus apparatus.

8. The method of claim 7, which includes generating a first linger time for a first one of the individual gaming machines, and generating a second, different linger time for a second, different one of the individual gaming machines.

9. The method of claim 7, wherein the linger time for a one of the value elements through a first display portion of the bonus apparatus associated with a first of the individual gaming machines is based on a first signal strength of the first of the individual gaming machines and the linger time for said one of the value elements through a second display portion of the bonus apparatus associated with a second of the individual gaming machines is based on a second, different signal strength of the second of the individual gaming machine.

10. The method of claim 1, wherein the triggering event includes a play of a bonus game.

11. A computerized method of operating a gaming system having a plurality of individual gaming machines and a bonus apparatus operatively coupled to said plurality of individual gaming machines, the method comprising:

associating a plurality of display stations of the bonus apparatus with a plurality of the individual gaming machines;

placing causing the bonus apparatus to display a plurality of value elements, the value elements being movable to a plurality of the display stations of the bonus apparatus;

enabling a plurality of players of the plurality of individual gaming machines to each place at least one wager on at least one play of at least one base game;

associating an attractive signal strength to each of the plurality of individual gaming machines, the attractive signal strength of each individual gaming machine being based, at least in part, on any wagers placed on any plays of any base games of said individual gaming machine, wherein a determination of if at least one value element moves to the display station of the bonus apparatus associated with the individual gaming machine is based, at least in part, on the attractive signal strength of said individual gaming machine; and if a triggering event occurs in association with at least one of the individual gaming machines, providing the player of said at least one individual gaming machine an award based on any value elements displayed, when the triggering event occurs, at the display station of the bonus apparatus associated with the individual gaming machine, wherein said triggering event occurs distinct from any determination of if any value elements are displayed at the display station of the bonus apparatus associated with the individual gaming machine.

12. The method of claim 11, which includes presenting a status of a quantity of value elements at one of the display stations of the bonus apparatus.

13. The method of claim 11, which includes presenting a status of a quantity of value elements at one of the display stations of the bonus apparatus associated with one of the individual gaming machines, and presenting a quantity of value elements at at least another one of the display stations of the bonus apparatus associated with another one of the individual gaming machines.

14. The method of claim 11, wherein the value elements include icons displayed at the display stations of the bonus apparatus.

15. The method of claim 14, wherein a size of at least one of the value elements is related to a value of said at least one value element.

16. The method of claim 14, which includes causing the bonus apparatus to display a number indicating a value in association with at least one of the value elements.

17. The method of claim 14, wherein a value of each of a plurality of the value elements is not revealed prior to the occurrence of the triggering event.

18. The method of claim 11, which includes varying a travel speed of the value elements.

19. The method of claim 11, which includes varying an amount of time one of the value elements is displayed at the display stations of the bonus apparatus, wherein the value elements stays longer at display stations of the bonus apparatus associated with individual gaming machines having higher signal strengths.

20. A non-transitory machine-readable medium that provides instructions that, when executed by a machine, cause the machine to perform operations comprising:

associating a plurality of display stations of a bonus apparatus with a plurality of individual gaming machines;

causing the bonus apparatus to display a plurality of value elements, the value elements being movable to a plurality of the display stations of the bonus apparatus;

enabling a plurality of players of the plurality of individual gaming machines to each place at least one wager on at least one play of at least one base game;

associating an attractive signal strength to each of the individual gaming machines, the attractive signal strength of each individual gaming machine being based, at least in part, on any wagers placed on any plays of any base games of said individual gaming machine, wherein a determination of if at least one value element moves to the display station of the bonus apparatus associated with the individual gaming machine is based, at least in part, on the attractive signal strength of said individual gaming machine; and if a triggering event occurs in association with at least one of the individual gaming machines, providing the player of said at least one individual gaming machine an award based on any value elements displayed, when the triggering event occurs, at the display station of the bonus apparatus associated with the individual gaming machine, wherein said triggering event occurs distinct from any determination of if any value elements are displayed at the display station of the bonus apparatus associated with the individual gaming machine.

21. The non-transitory machine-readable medium of claim 20, that provides instructions that, when executed by the machine, cause the machine to perform operations that include moving the value elements through one of the display stations at a speed based, at least in part, on the attractive signal strength of the individual gaming machine associated with said display station.

22. The non-transitory machine-readable medium of claim 20, that provides instructions that, when executed by the machine, cause the machine to perform operations that include stopping at least one value element at one of the display stations for a time based, at least in part, on the attractive signal strength of the individual gaming machine associated with said display station.

23. The non-transitory machine-readable medium of claim 20, that provides instructions that, when executed by the machine, cause the machine to perform operations that include displaying the value elements as icons.

24. A computer gaming system comprising:

a plurality of individual gaming machines, each gaming machine including:

at least one input device, at least one display device, at least one processor, and at least one memory device which stores a plurality of instructions, which when executed by the at least one processor, causes the at least one processor to operate with the at least one input device and the at least one display device to enable a player to place at least one wager on at least one play of at least one base game; and a bonus apparatus including a plurality of display stations, said bonus apparatus and said plurality of individual gaming machines programmed to operate to:

display a plurality of value elements moving to the plurality of display stations of the bonus apparatus;

associate an attractive signal strength to each of the plurality of individual gaming machines, the attractive signal strength of each individual gaming machine being based, at least in part, on any wagers placed on any plays of any base games of said individual gaming machine, wherein a determination of if at least one value element moves to the display station of the bonus apparatus associated with the individual gaming machine is based, at least in part, on the attractive signal strength of said individual gaming machine; and if a triggering event occurs in association with at least one of the individual gaming machines, providing the player of said at least one individual gaming machine an award based on any value elements displayed, when the triggering event occurs, at the display station of the bonus apparatus associated with the individual gaming machine, wherein said triggering event occurs distinct from any determination of if any value elements are displayed at the display station of the bonus apparatus associated with the individual gaming machine.

* * * * *

UNITED STATES PATENT AND TRADEMARK OFFICE

CERTIFICATE OF CORRECTION

PATENT NO. : 8,662,982 B1
APPLICATION NO. : 13/631100
DATED : March 4, 2014
INVENTOR(S) : Vincent P. Smith et al.

It is certified that error appears in the above-identified patent and that said Letters Patent is hereby corrected as shown below:

IN THE CLAIMS

In Claim 1, Column 18, Line 63, between “the” and “individual” insert --at least one--.
In Claim 1, Column 18, Line 67, between “the” and “individual” insert --at least one--.
In Claim 2, Column 19, Line 2, between “the” and “value” insert --at least one--.
In Claim 2, Column 19, Line 2, replace “elements” with --element--.
In Claim 4, Column 19, Line 15, replace “plurality of” with --at least one--.
In Claim 4, Column 19, Line 16, replace “elements” with --element--.
In Claim 5, Column 19, Line 18, replace “plurality of the” with --at least one--.
In Claim 5, Column 19, Line 19, replace “elements” with --element--.
In Claim 6, Column 19, Line 22, between “the” and “value” insert --at least one--.
In Claim 6, Column 19, Line 22, replace “elements” with --element--.
In Claim 7, Column 19, Line 27, between “the” and “value” insert --at least one--.
In Claim 7, Column 19, Line 27, replace “elements” with --element--.
In Claim 7, Column 19, Line 28, between “said” and “value” insert --at least one--.
In Claim 9, Column 19, Line 34, delete “a”.
In Claim 9, Column 19, Line 35, between the first instance of “the” and “value” insert --at least one--.
In Claim 9, Column 19, Line 35, replace “elements” with --element--.
In Claim 9, Column 19, Line 39, between “the” and “value” insert --at least one--.
In Claim 9, Column 19, Line 39, replace “elements” with --element--.
In Claim 11, Column 19, Line 52, delete “placing”.
In Claim 19, Column 20, Line 38, replace “elements” with --element--.

Signed and Sealed this
Nineteenth Day of May, 2015

Michelle K. Lee

Michelle K. Lee
*Director of the United States Patent and Trademark Office*